(12) United States Patent
Zhu et al.

(10) Patent No.: US 12,359,129 B2
(45) Date of Patent: Jul. 15, 2025

(54) LIQUID CRYSTAL MATERIAL APPLIED TO MULTI-RESPONSE-MODE SMART WINDOW AND APPLICATION THEREOF

(71) Applicant: HARBIN INSTITUTE OF TECHNOLOGY, Harbin (CN)

(72) Inventors: Jiaqi Zhu, Harbin (CN); Ruicong Zhang, Harbin (CN); Tianyu Wang, Harbin (CN); Yurong He, Harbin (CN); Zhibo Zhang, Harbin (CN); Jiajun Li, Harbin (CN); Zicheng Song, Harbin (CN); Lei Yang, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 18/741,310

(22) Filed: Jun. 12, 2024

(65) Prior Publication Data

US 2024/0327710 A1 Oct. 3, 2024

Related U.S. Application Data

(63) Continuation of application No. PCT/CN2023/078514, filed on Feb. 27, 2023.

(30) Foreign Application Priority Data

Feb. 20, 2023 (CN) .......................... 202310136515.3

(51) Int. Cl.
*C09K 19/58* (2006.01)
*C09K 19/52* (2006.01)
(Continued)

(52) U.S. Cl.
CPC ............ *C09K 19/58* (2013.01); *C09K 19/601* (2013.01); *G02F 1/13306* (2013.01); *C09K 2019/528* (2013.01)

(58) Field of Classification Search
CPC ...... C09K 19/58; C09K 19/601; C09K 19/30; C09K 2019/528; G02F 1/13306;
(Continued)

(56) References Cited

U.S. PATENT DOCUMENTS 4,066,569 A   1/1978 Lim

FOREIGN PATENT DOCUMENTS

CN   109370615 A   2/2019
CN   110780503 A   2/2020
(Continued)

OTHER PUBLICATIONS

Machine translation of FR2850976A1 (Year: 2004).*
(Continued)

*Primary Examiner* — Anne M Hines
*Assistant Examiner* — Jose M Diaz

(57) ABSTRACT

Provided is a liquid crystal material applied to a multi-response-mode smart window and an application thereof. The present disclosure relates to a liquid crystal material and an application thereof. The problem of high drive voltage of the liquid crystal smart window based on dynamic scattering mode in the prior arts can be solved. The liquid crystal material applied to the multi-response-mode smart window is formed by mixing a dichroic dye, an ionic dopant and a liquid crystal. It is applied to preparing an electrohydrodynamics liquid crystal dimming device which is capable of switching among transparent state, light-absorbing state and scattering state under a drive voltage of 5V to 50V and a drive frequency of 1 Hz to 5 kHz.

10 Claims, 30 Drawing Sheets

(51) Int. Cl.
*C09K 19/60* (2006.01)
*G02F 1/133* (2006.01)

(58) Field of Classification Search
CPC .... G02F 1/13725; G02F 1/137; G02F 1/1333; G02F 1/13756
See application file for complete search history.

(56) References Cited

FOREIGN PATENT DOCUMENTS

| CN | 111221195 A | 6/2020 |
|---|---|---|
| CN | 112154189 A | 12/2020 |
| CN | 113512146 A | 10/2021 |
| CN | 113767325 A | 12/2021 |
| CN | 114442349 A | 5/2022 |
| CN | 114675456 A | 6/2022 |
| CN | 115667461 A | 1/2023 |
| FR | 2850976 A1 * | 8/2004 ............ C09K 19/02 |
| KR | 20190042927 A | 4/2019 |
| WO | 2022065037 A1 | 3/2022 |
| WO | 2022094618 A1 | 5/2022 |

OTHER PUBLICATIONS

International Search Report of PCT/CN2023/078514.
Written Opinion of PCT/CN2023/078514.
Mikhail N. Krakhalev et al. Anionic-cationic surfactant mixture providing the electrically controlled homeotropic surface anchoring of liquid crystals. In Journal of Molecular Liquids, 282. Feb. 28, 2019.
Zhang Ruicong et al. Advanced liquid crystal-based switchable optical devices for light protection applications: principles and strategies. In Light: Science & Applications. Jan. 3, 2023.
Yuanyuan Zhan et al. Electrohydrodynamic instabilities for smart window applications. Liquid Crystals. Dec. 11, 2019.

* cited by examiner

LIQUID CRYSTAL MATERIAL APPLIED TO MULTI-RESPONSE-MODE SMART WINDOW AND APPLICATION THEREOF

CROSS-REFERENCE TO RELATED APPLICATIONS

This application is a bypass application of PCT/CN2023/078514. This application claims priorities from PCT Application No. PCT/CN2023/078514, filed Feb. 27, 2023, and from the Chinese patent application 202310136515.3 filed Feb. 20, 2023, the content of which are incorporated herein in the entirety by reference.

TECHNICAL FIELD

The present disclosure relates to a liquid crystal material and an application thereof.

BACKGROUND

Dynamic scattering mode (DSM) also referred to as electrohydrodynamic instabilities (EHDI) in some literatures has been discovered and reported in the 1960s. It was initially applied to manufacturing scatter-based displays. In a case of sufficiently high electric field strength, turbulence can be generated due to oscillation of the ions between electrodes and further result in light scattering, which can induce the dynamic scattering mode. With rise of the smart window technologies, the light scattering mode has very high requirements in the practices. The researchers can increase the electric conductivity of a liquid crystal (LC) mixture by doping ions in the body liquid crystals, so as to reduce a threshold voltage.

On the other hand, by comparing different types of ions doped in the liquid crystals, it is found that the positive charges of the organic part of the ionic compounds are home to the turbulences and result in activation of the electrohydrodynamic instability. However, so far, the facts prove that the cationic surfactant-tetrabutylammonium bromide (TBAB), dodecyltrimethyl ammonium bromide (DTAB) or cetyltrimethylammonium bromide (CTAB) or the like is doped as ionic additive into negative achiral or chiral nematic liquid crystal (LC) or SmA LC, which can, under the condition of industrial power supply frequency, cause the threshold voltage of the dynamic scattering mode to be still high (usually, greater than 50V).

Furthermore, researches show that the threshold voltage required for promoting the LC instability is liable to the applied electric field frequency.

SUMMARY

In order to solve the problem of high drive voltage of the liquid crystal smart window based on dynamic scattering mode, the present disclosure provides a liquid crystal material applied to a multi-response-mode smart window and an application thereof.

The liquid crystal material applied to the multi-response-mode smart window is formed by mixing a dichroic dye, an ionic dopant and a liquid crystal;

the ionic dopant is a combination of a cationic surfactant and an anionic surfactant, wherein a weight ratio of the cationic surfactant to the anionic surfactant is 1:(0.1 to 10).

There is provided an application of the liquid crystal material applied to the multi-response-mode smart window as mentioned above. The liquid crystal material is applied to preparing an electrohydrodynamic liquid crystal dimming device which is capable of switching among transparent state, light-absorbing state and scattering state under a drive voltage of 5V to 50V and a drive frequency of 1 Hz to 5 kHz; and a thickness of a liquid crystal cell of the electrohydrodynamic liquid crystal dimming device is greater than 5 μm.

The present disclosure has the following beneficial effects:

(1) low drive voltage: in the prior arts, the drive voltage of the scattering mode is generally above 50V. In the present disclosure, multi-mode control is achieved by switching the drive electric field frequency, such that the entire dimming device can run under a low voltage (only require 5V to 50V), reducing energy consumption;

(2) designing of the switching frequency: by adjusting the ratio of the cations and anions of the dopant, the dynamic dielectric constant of the mixture is changed to achieve the designing of the switching frequency; and (3) long service life: in the present disclosure, the ions always oscillate back and forth in the liquid crystal layers of the dimming device and will not accumulate on the electrodes. Therefore, the service life of the DSM-based device can be increased.

BRIEF DESCRIPTIONS OF THE DRAWINGS

Figure 3A:
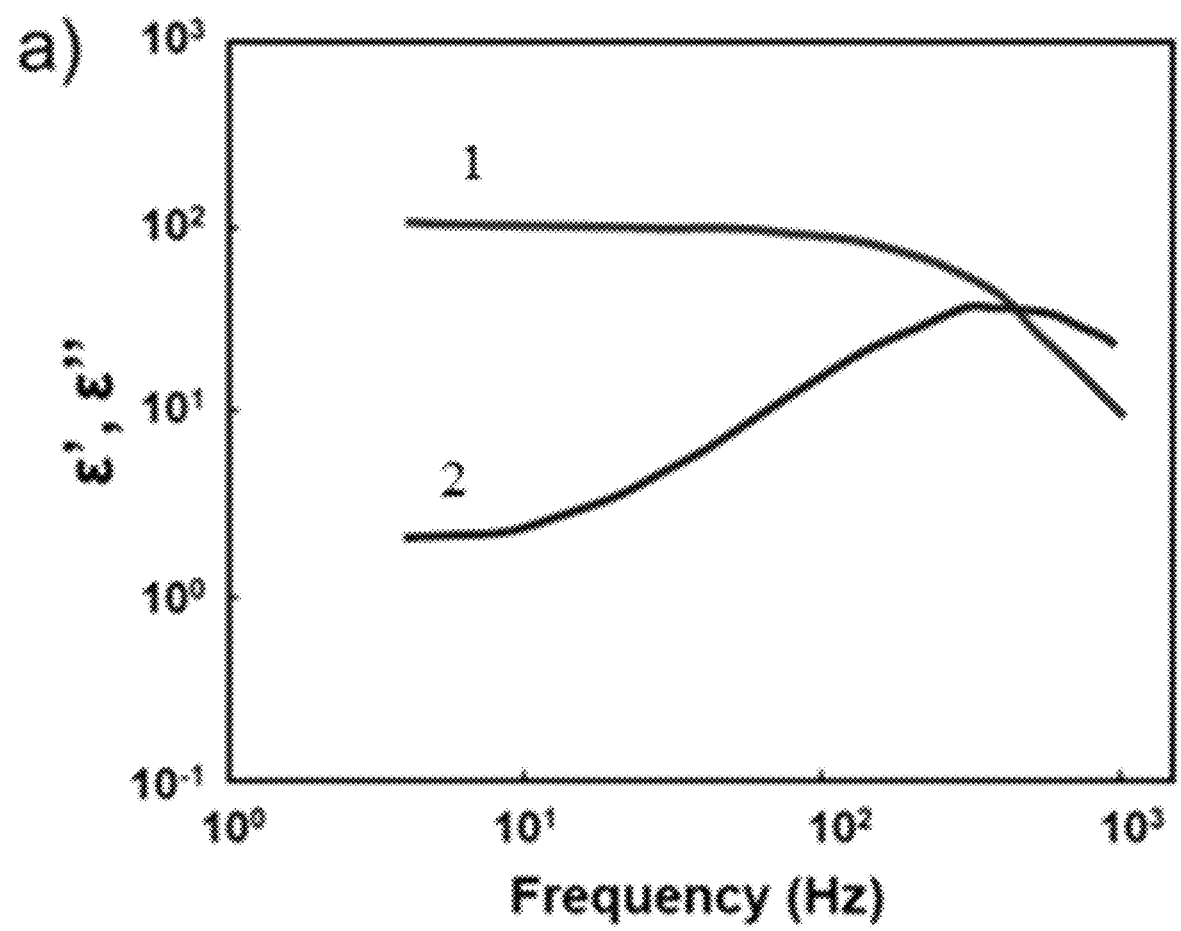
Figure 3B:
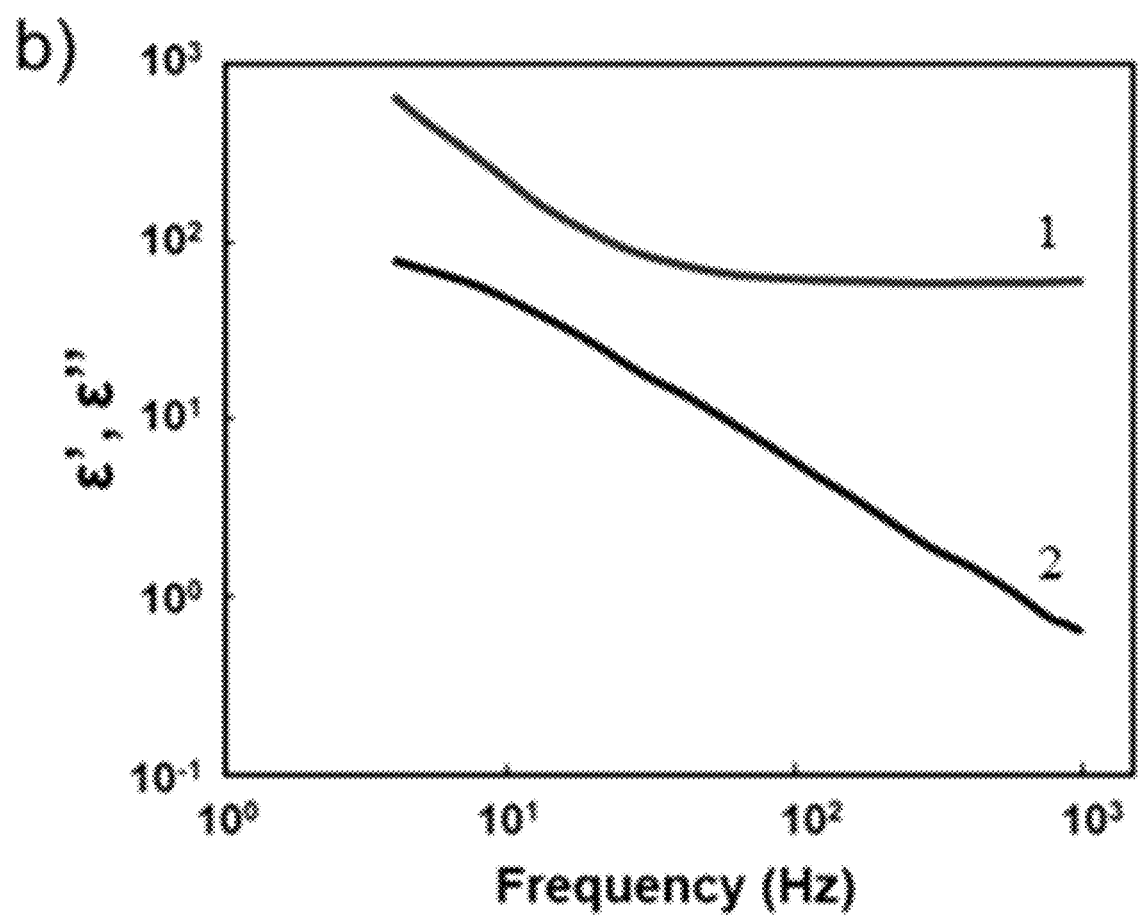
Figure 3C:
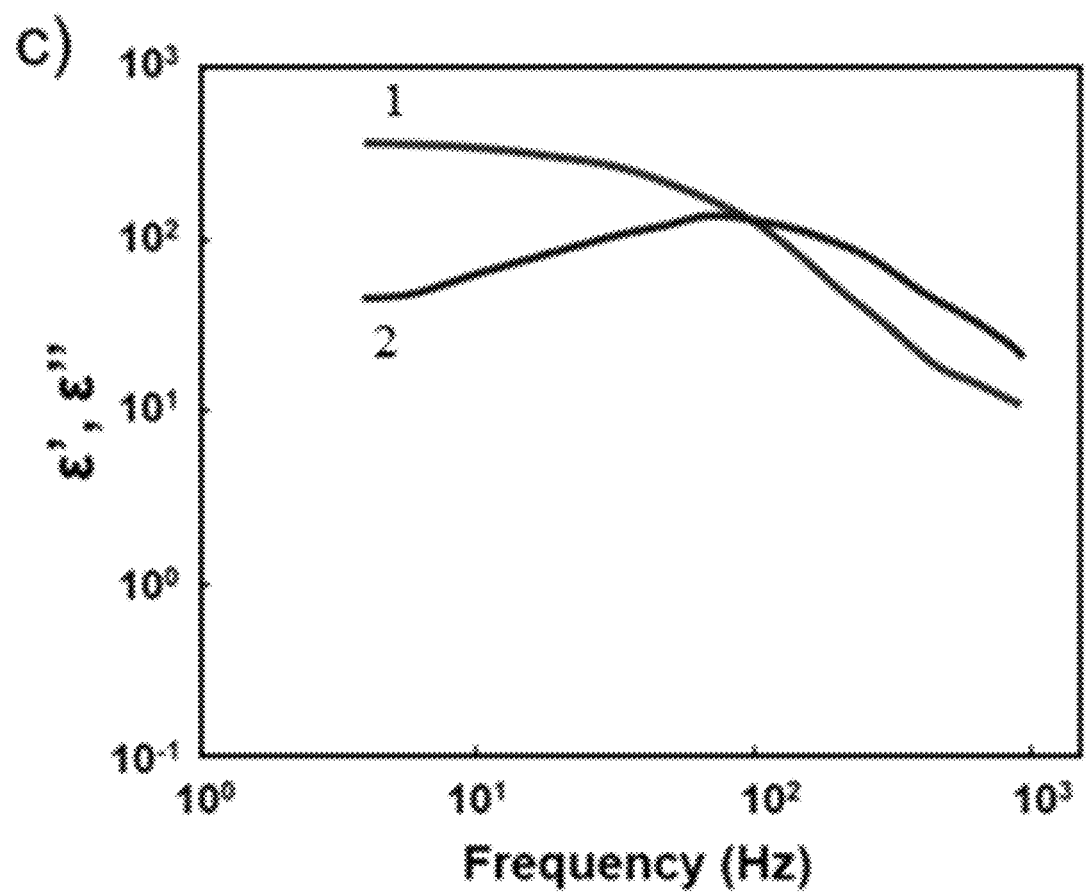
Figure 3D:
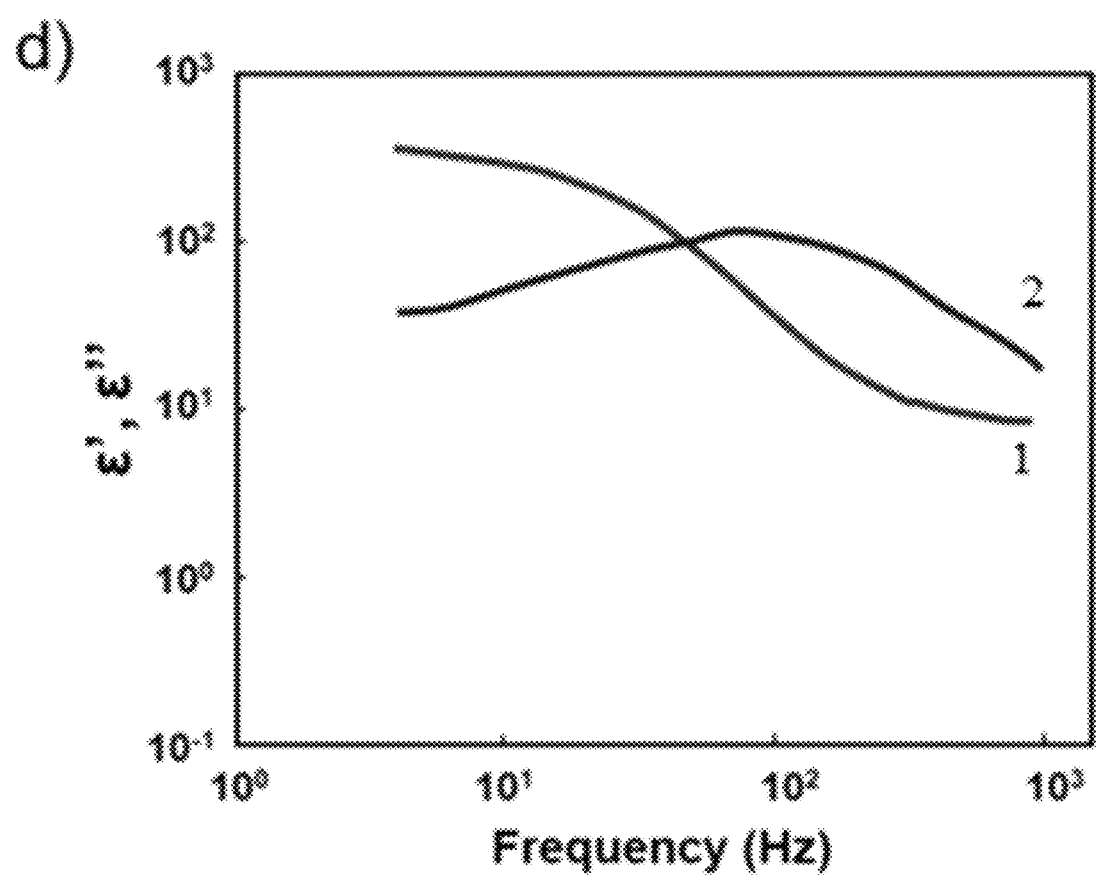

FIGS. 3A, 3B, 3C, and 3D are dielectric spectra, wherein FIG. 3A is a DSM device doped with cationic compound and dye in a comparison experiment 1; FIG. 3B is a DSM device doped with anionic compound and dye in a comparison experiment 2; FIG. 3C is a DSM device doped with cationic and anionic compounds in a comparison experiment 3; and FIG. 3D is a DSM device doped with cationic and anionic compounds and dye in an embodiment 1, where 1 is ε' and 2 is ε".

Figure 4A:
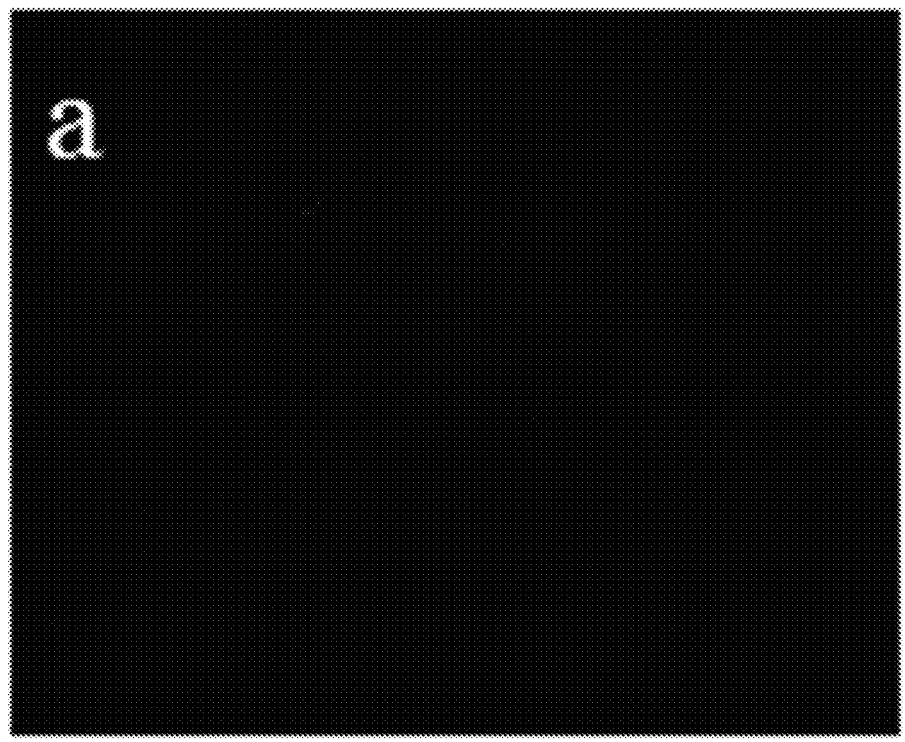
Figure 4B:
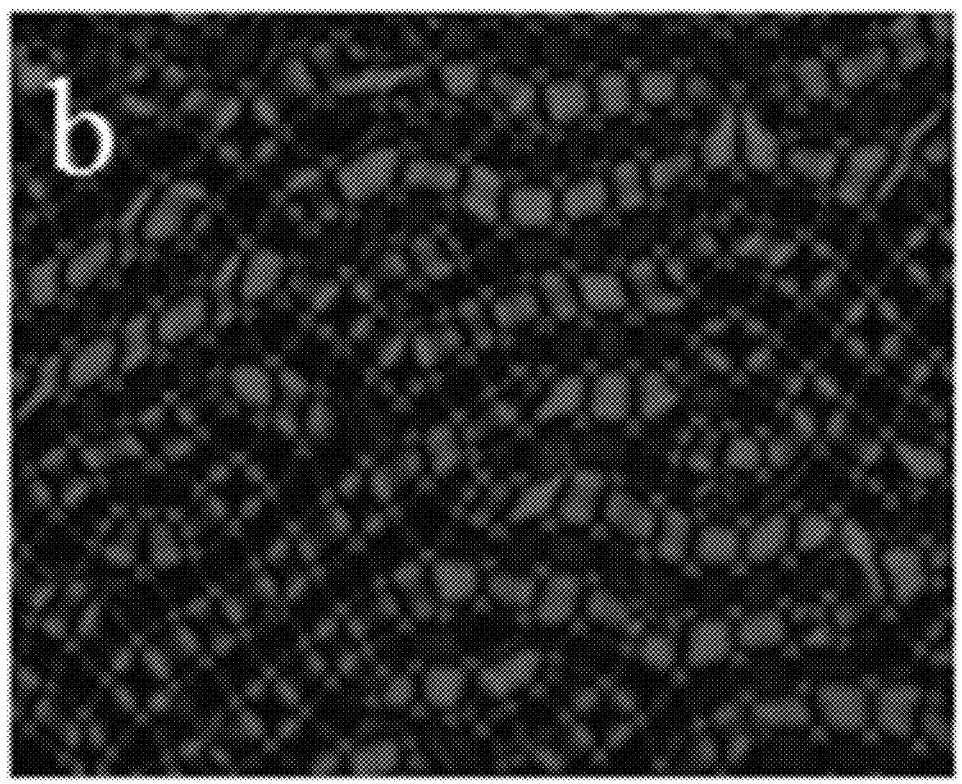
Figure 4C:
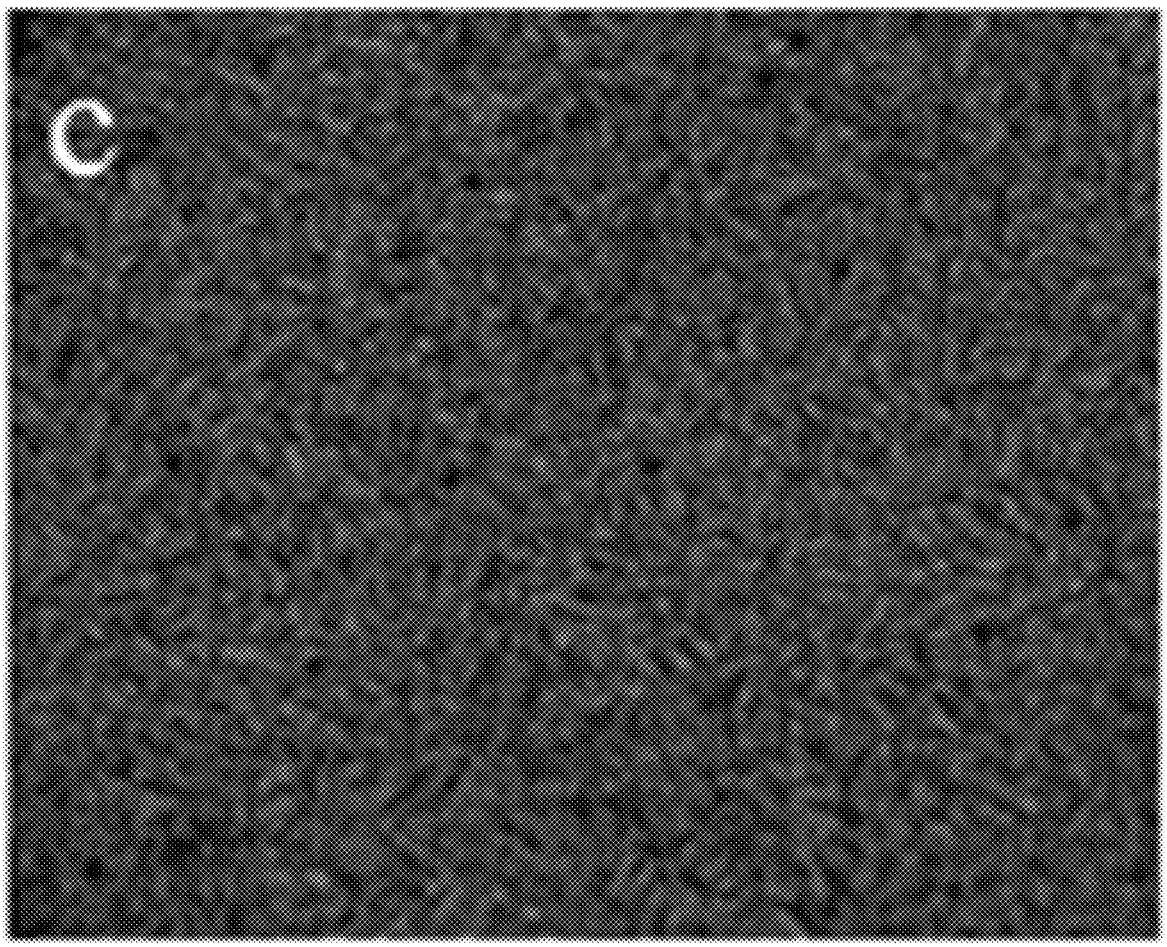

FIGS. 4A, 4B, and 4C are POM images of the DSM device doped with cationic and anionic compounds and dye under cross polarization in the embodiment 1, wherein FIG. 4A is measured under 0V, FIG. 4B is measured under 20V and 500 Hz, and FIG. 4C is measured under 20V and 50 Hz.

Figure 5A:
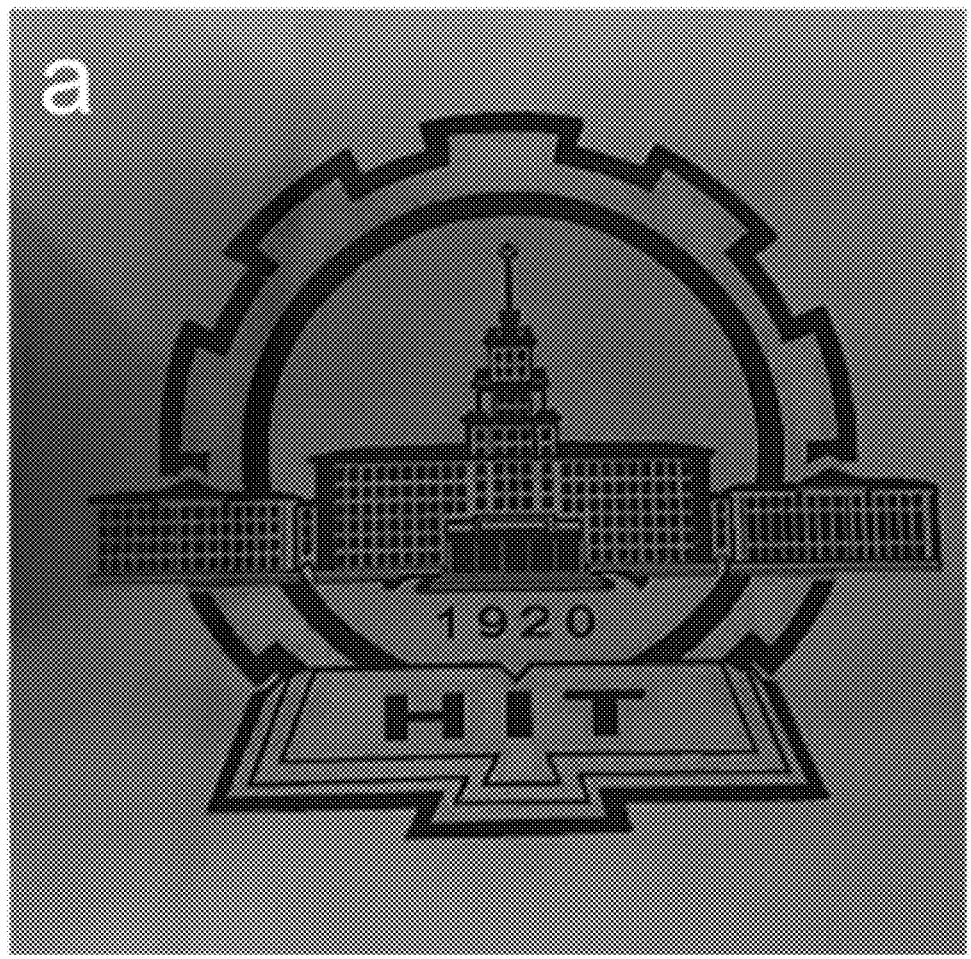
Figure 5B:
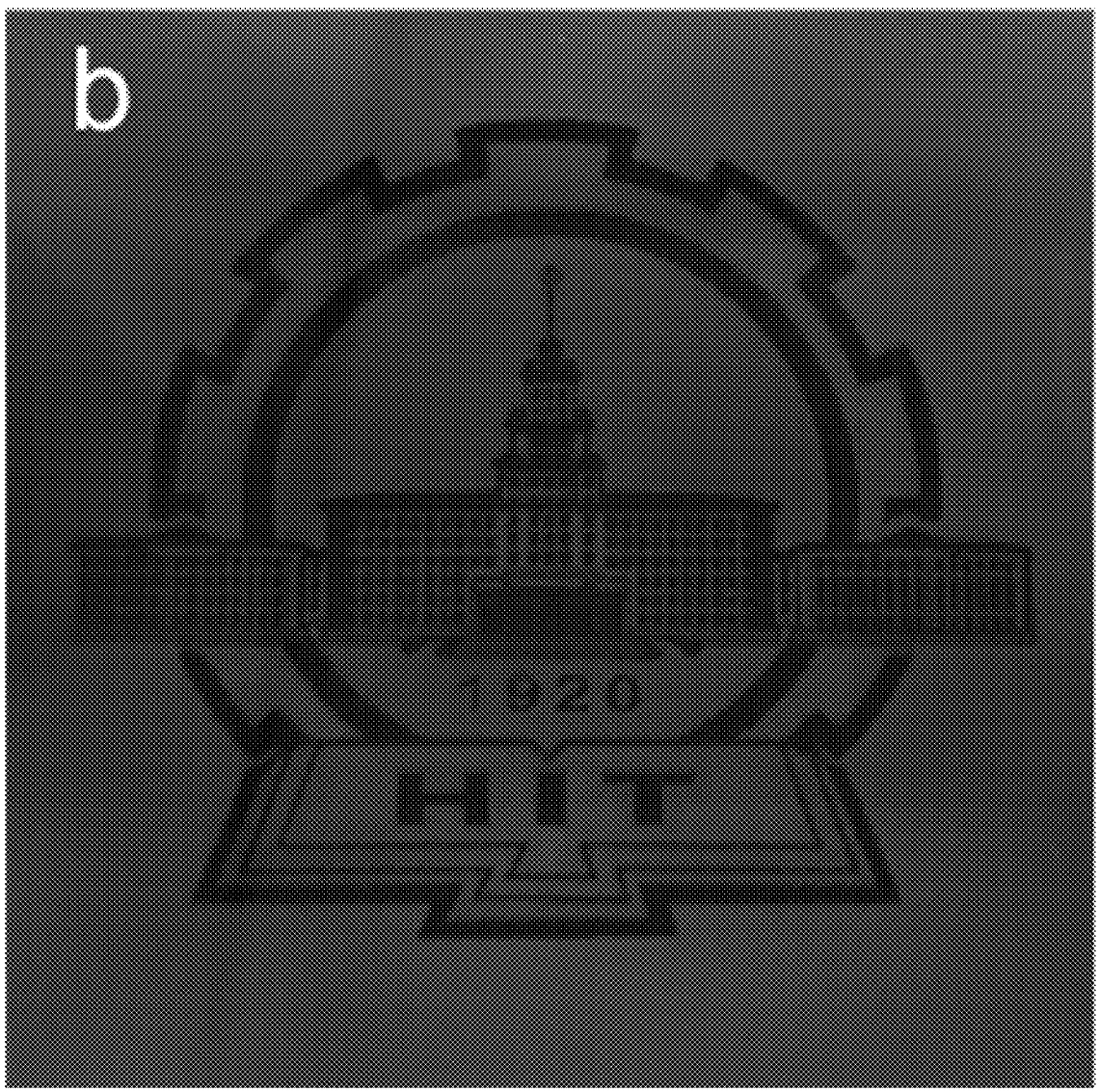
Figure 5C:
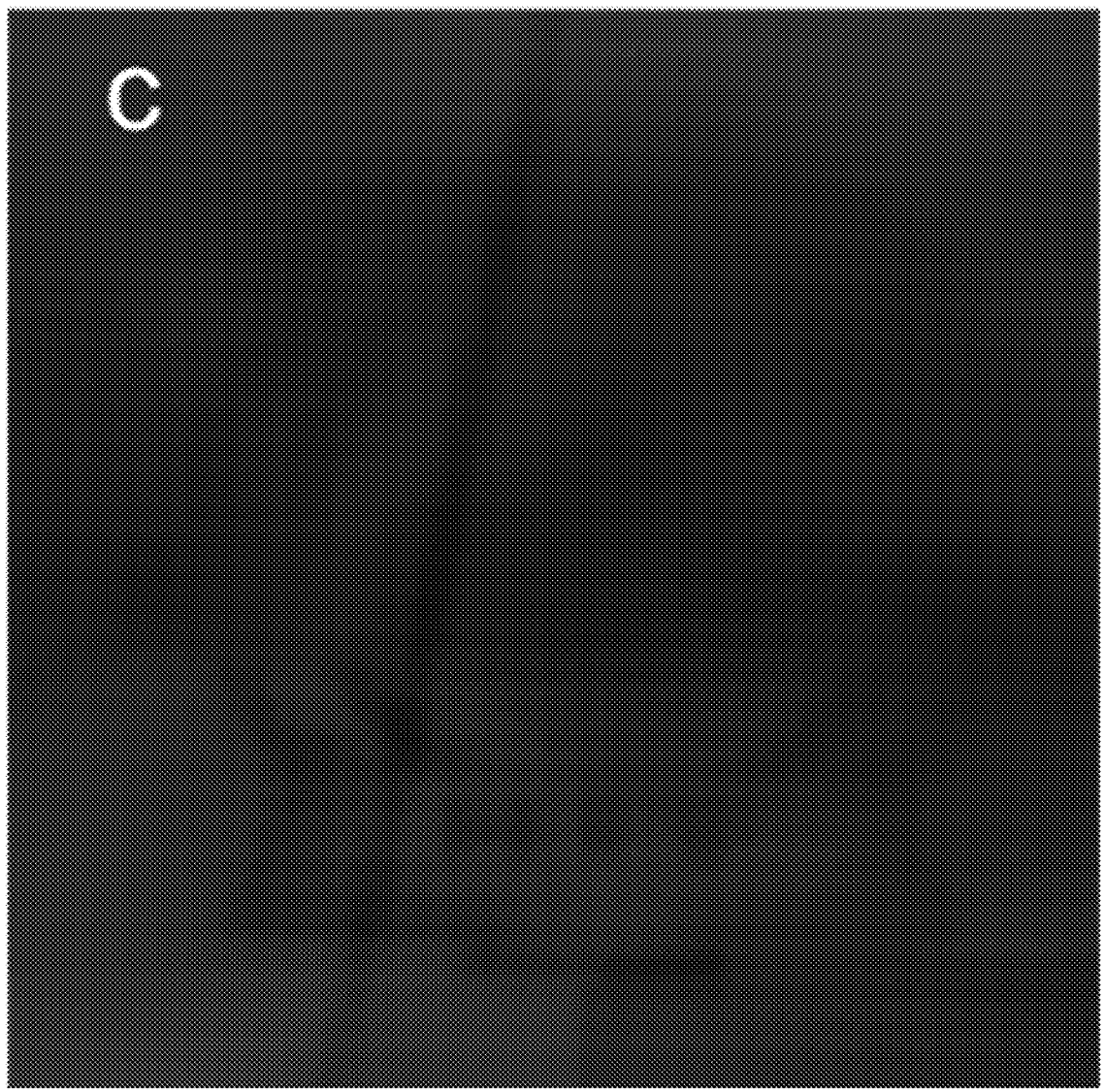
Figure 5D:
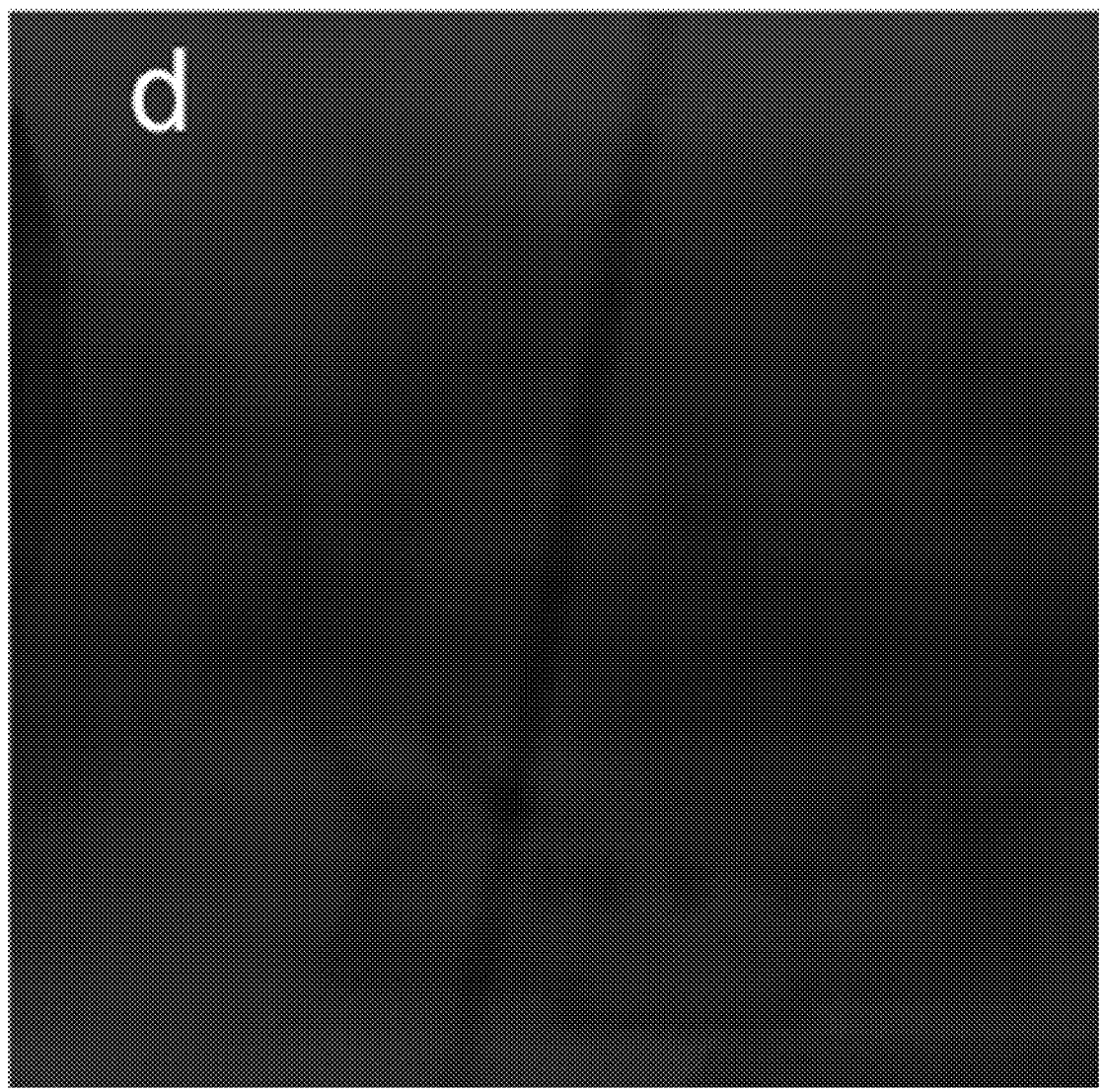

FIGS. 5A, 5B, 5C, and 5D are real pictures of the DSM device doped with cationic and anionic compounds and dye in the embodiment 1, wherein FIG. 5A is a transparent state under 0V, FIG. 5B is a light-absorbing state under 20V and 500 Hz, FIG. 5C is a scattering state under 20V and 50 Hz, and FIG. 5D is a scattering state after switching continuously for 10000 times under 20V and 50 Hz.

Figure 6A:
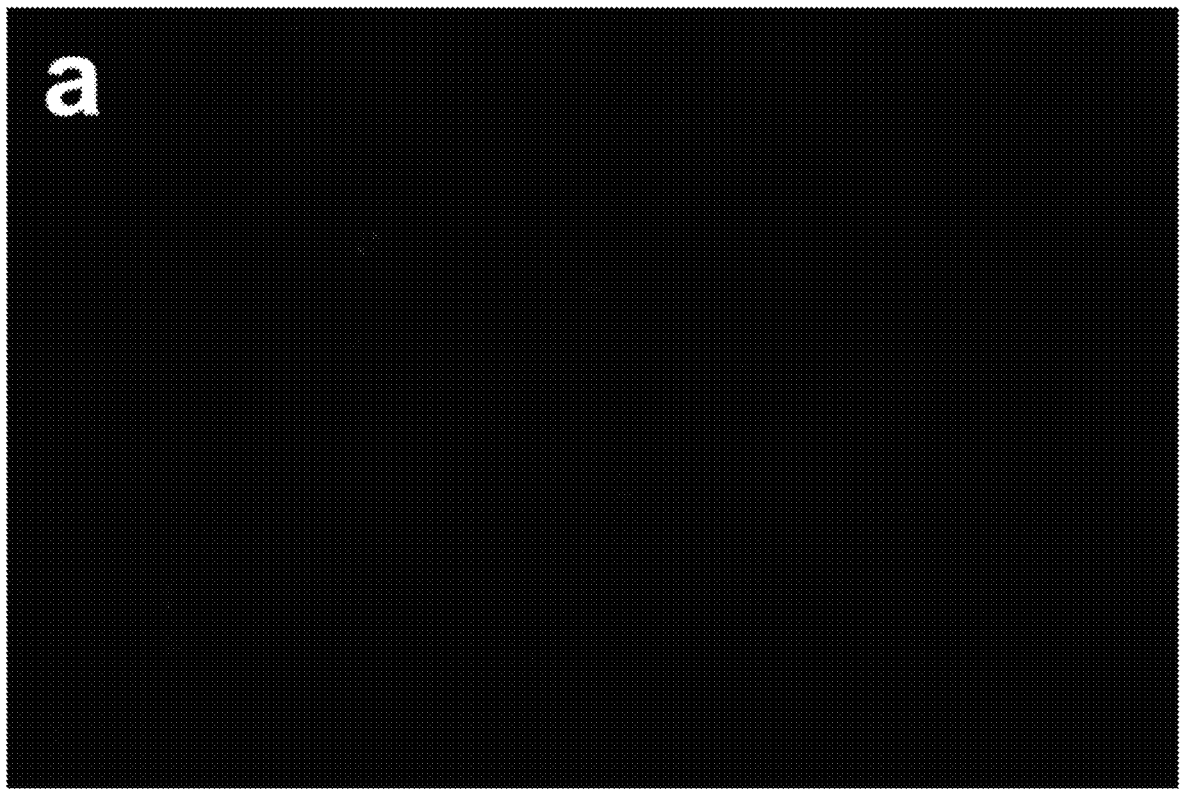
Figure 6B:
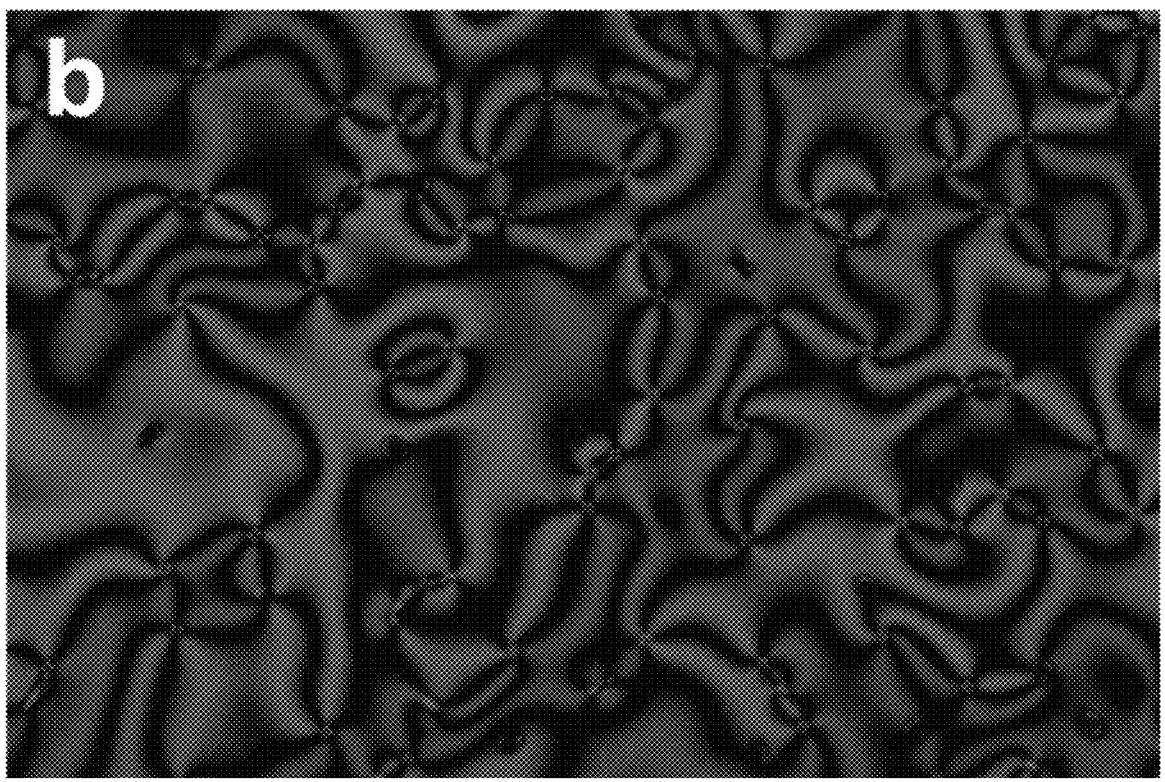
Figure 6C:
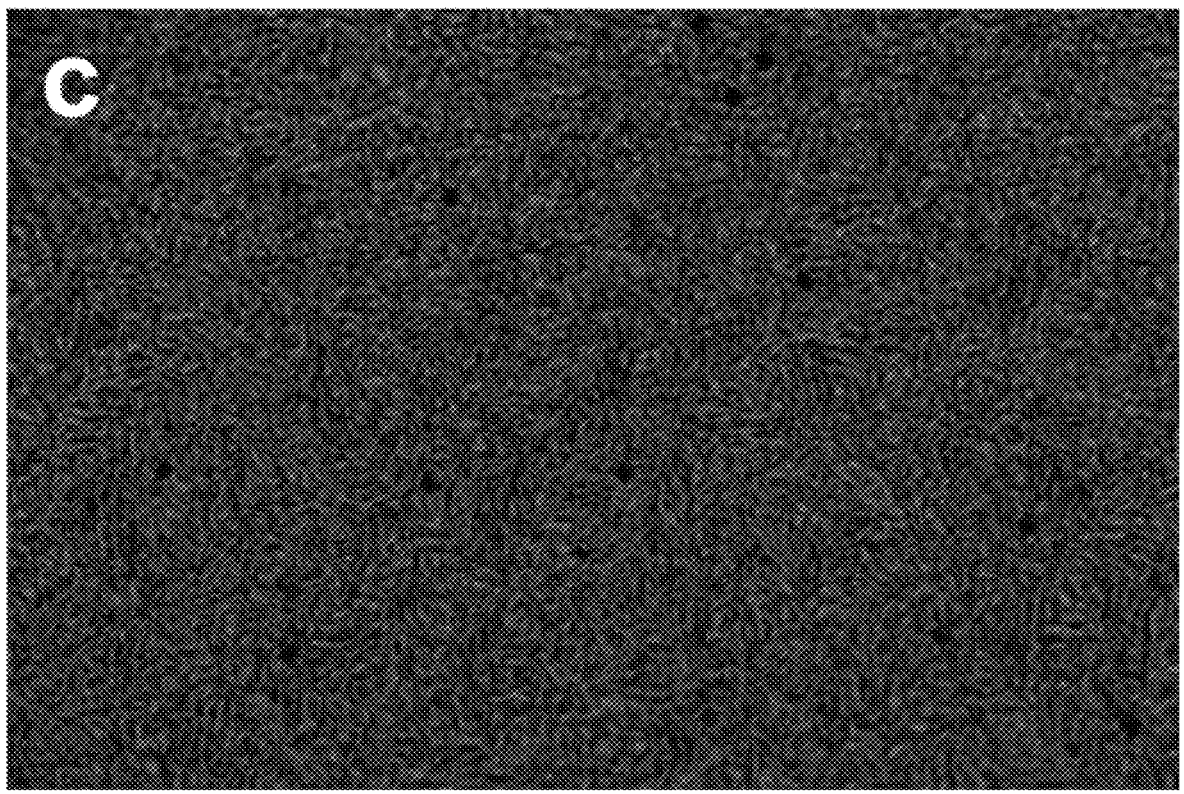

FIGS. 6A, 6B, and 6C are POM images of the DSM device doped with cationic compound and dye under cross polarization in the comparison experiment 1, wherein FIG. 6A is measured under 0V, FIG. 6B is measured under 20V and 100 Hz, and FIG. 6C is measured under 60V and 50 Hz.

Figure 7A:
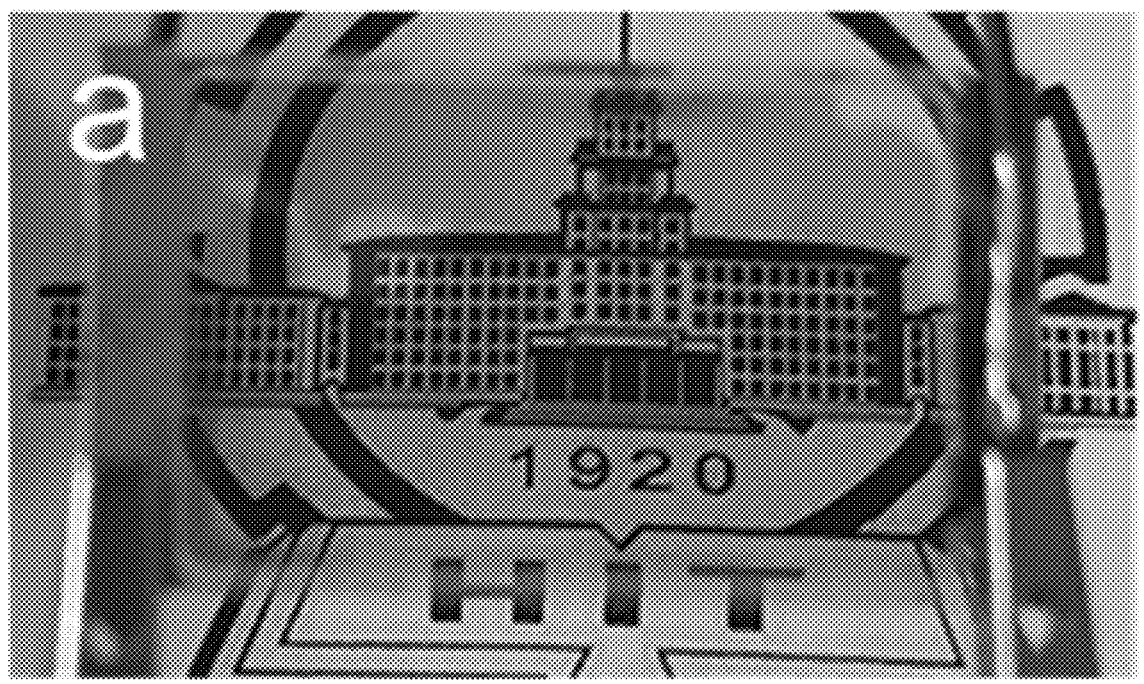
Figure 7B:
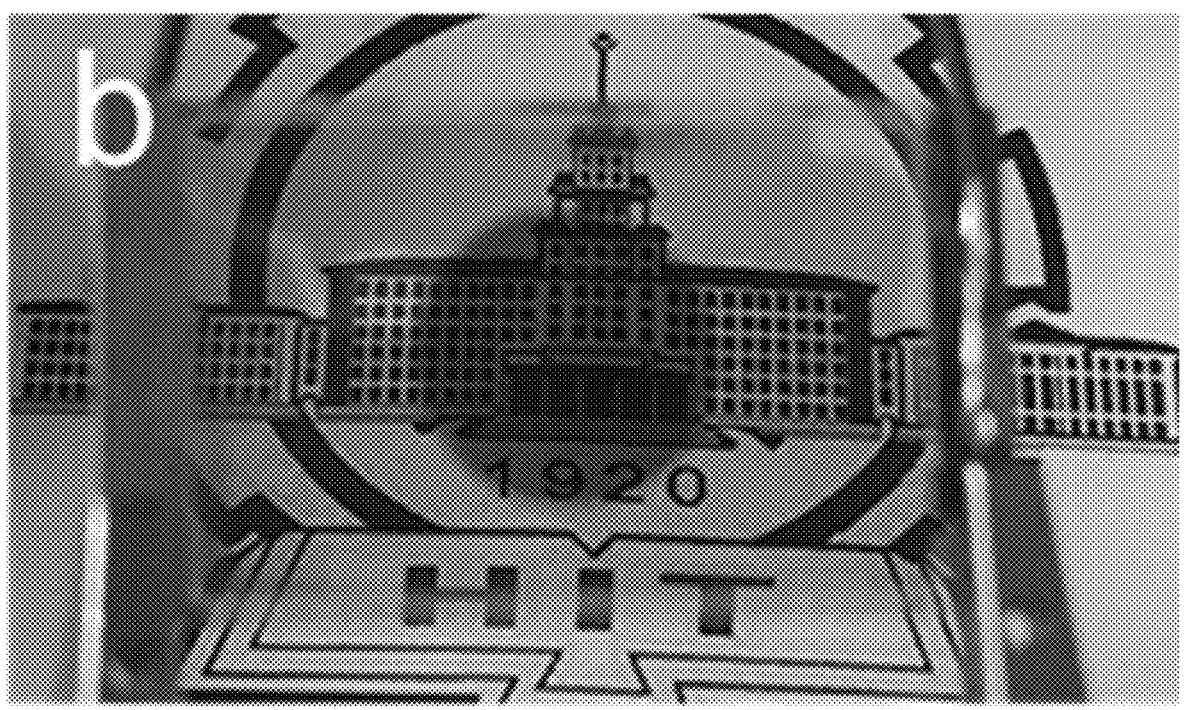
Figure 7C:
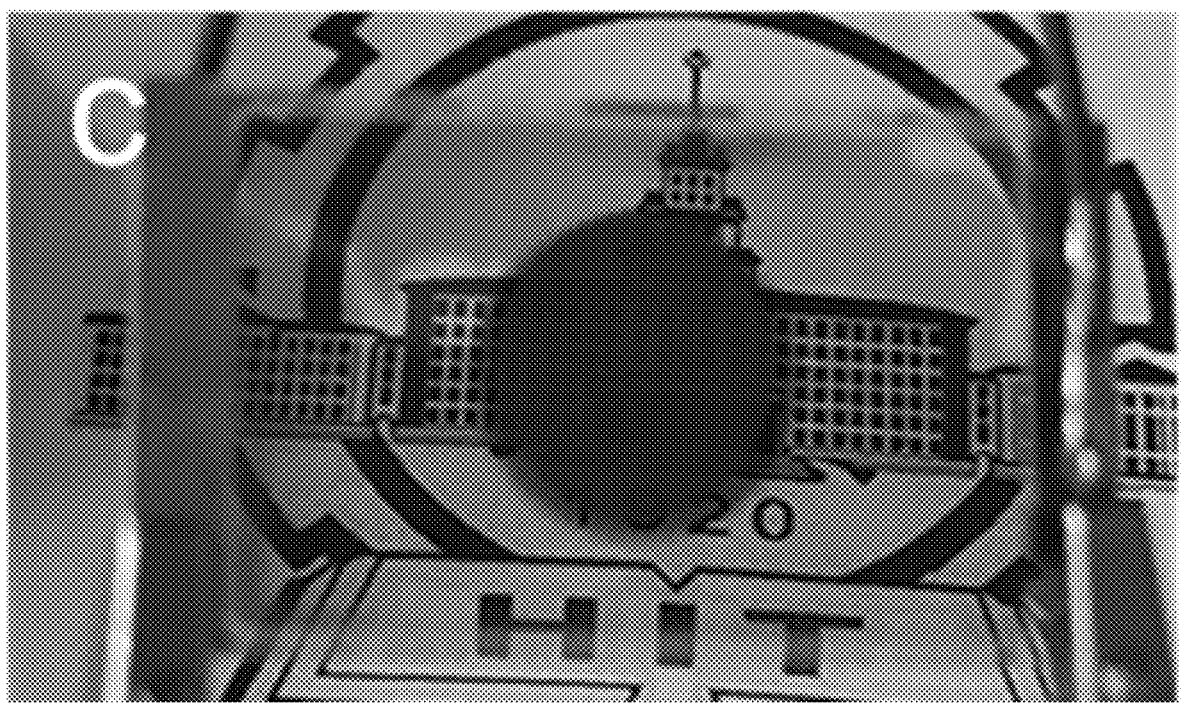
Figure 7D:

FIGS. 7A, 7B, 7C, and 7D are real pictures of the DSM device doped with cationic compound and dye in the comparison experiment 1, wherein FIG. 7A is a transparent state under 0V, FIG. 7B is a light-absorbing state under 20V and 100 Hz, FIG. 7C is a scattering state under 60V and 50 Hz, FIG. 7D is a scattering state after switching continuously for 10000 times under 60V and 50 Hz.

Figure 8A:
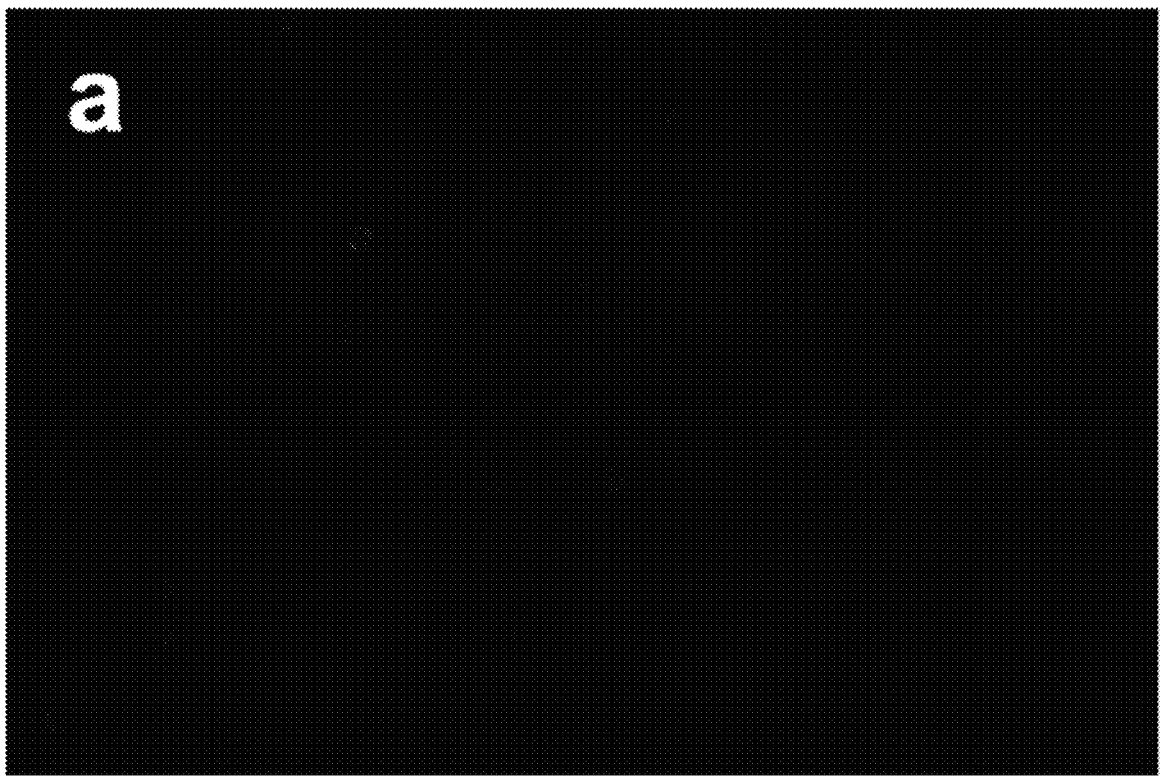
Figure 8B:
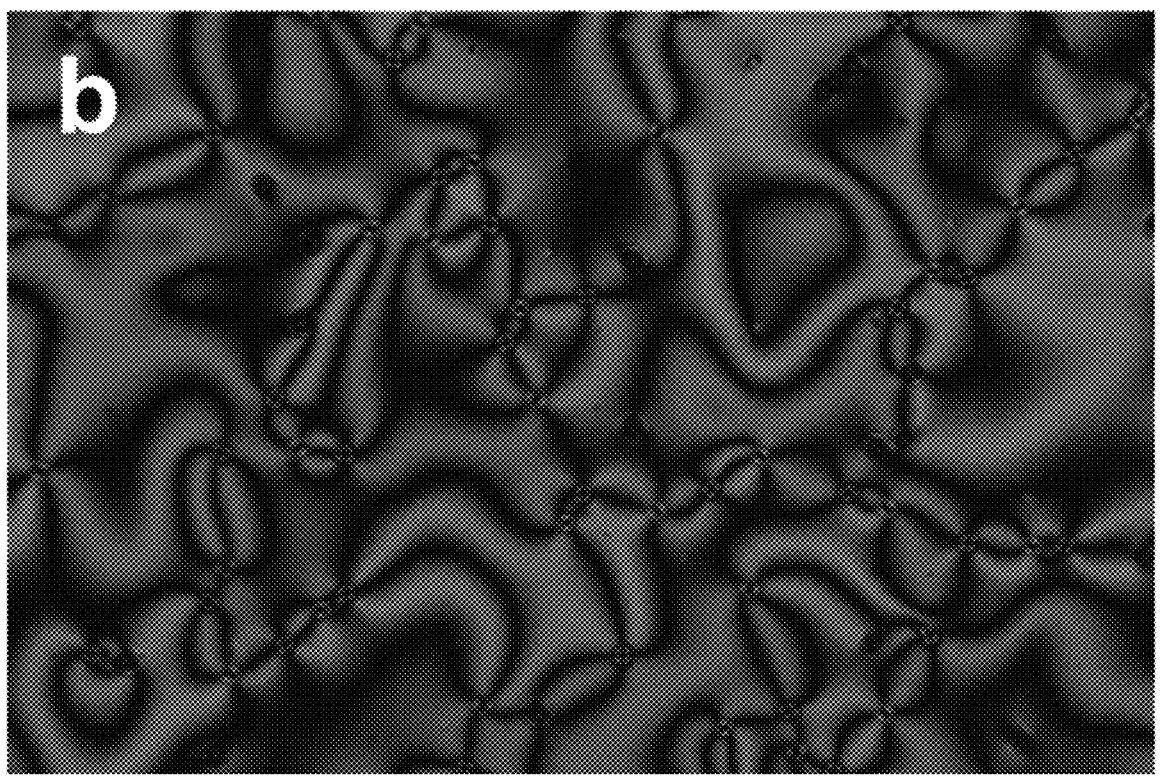
Figure 8C:
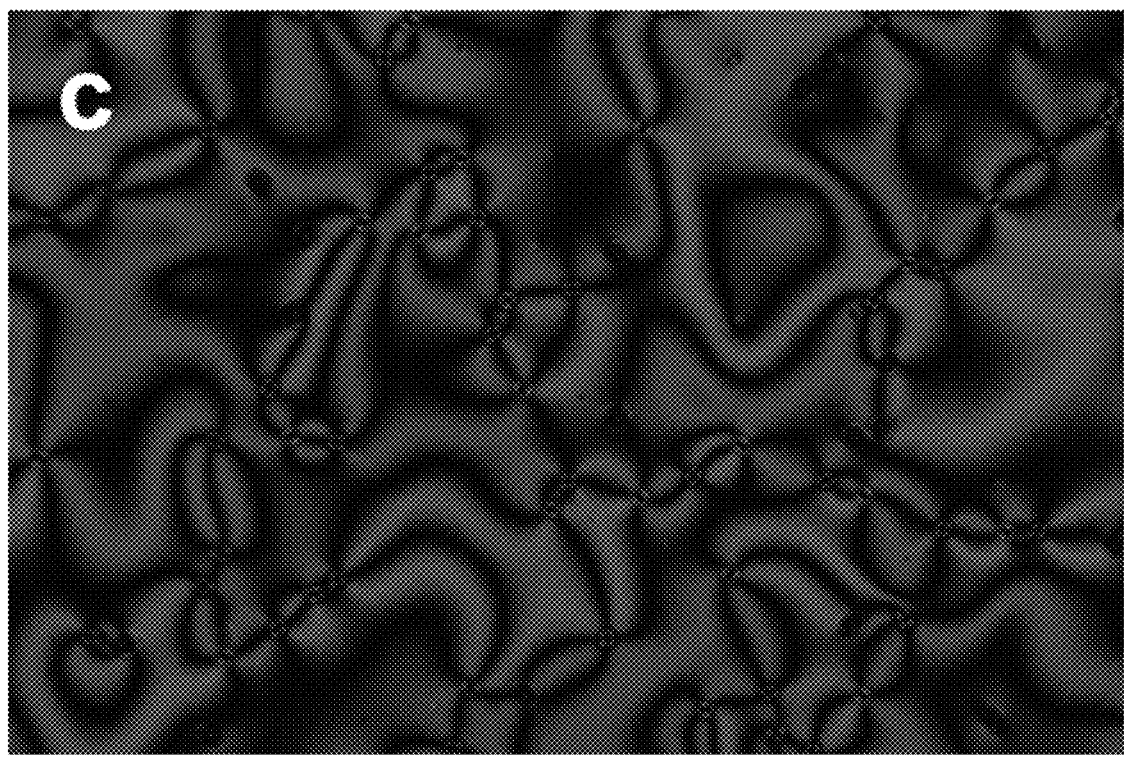

FIGS. 8A, 8B, and 8C are POM images of the DSM device doped with anionic compound and dye under cross polarization in the comparison experiment 2, wherein FIG. 8A is measured under 0V, FIG. 8B is measured under 20V and 100 Hz, and FIG. 8C is measured under 60V and 50 Hz.

Figure 9A:
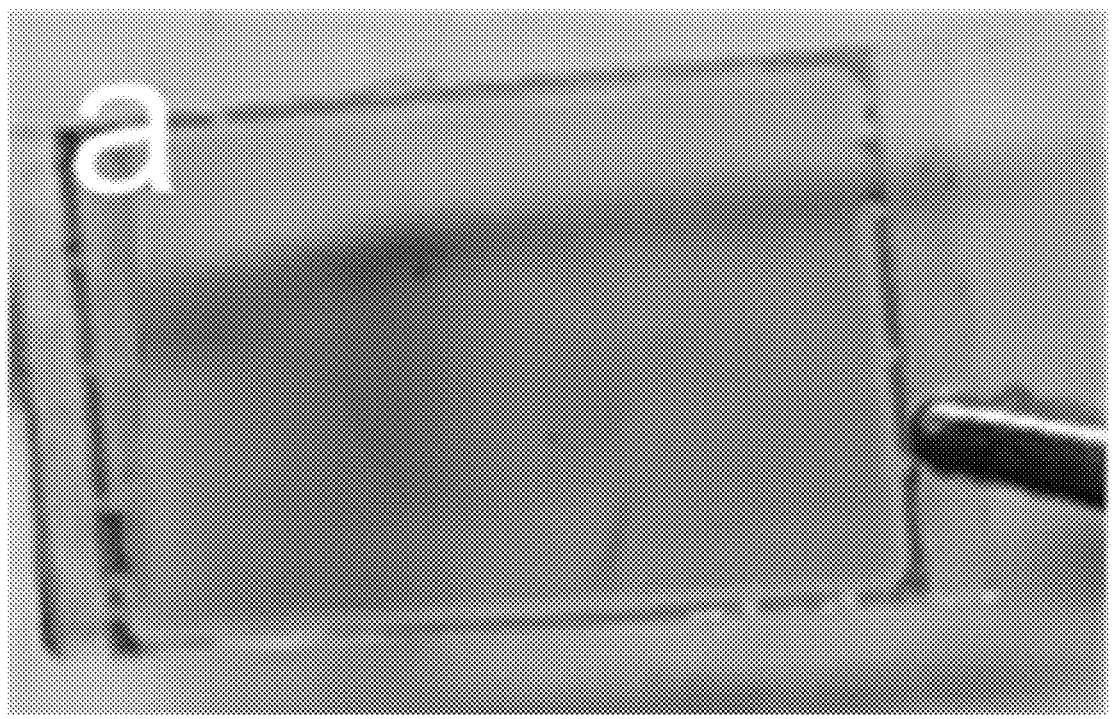
Figure 9B:
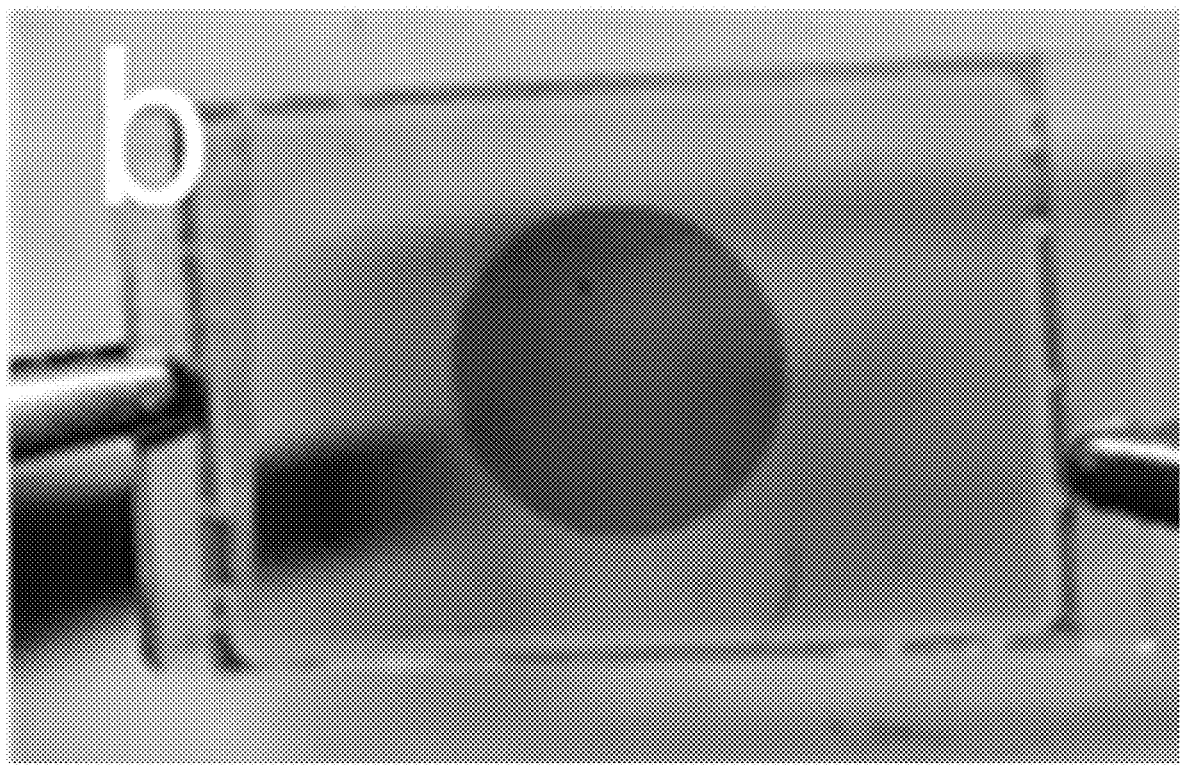

FIGS. 9A and 9B are real pictures of the DSM device doped with anionic compound and dye in the comparison experiment 2, wherein FIG. 9A is a transparent state under 0V, and FIG. 9B is a light-absorbing state under 20V and 100 Hz.

Figure 10A:
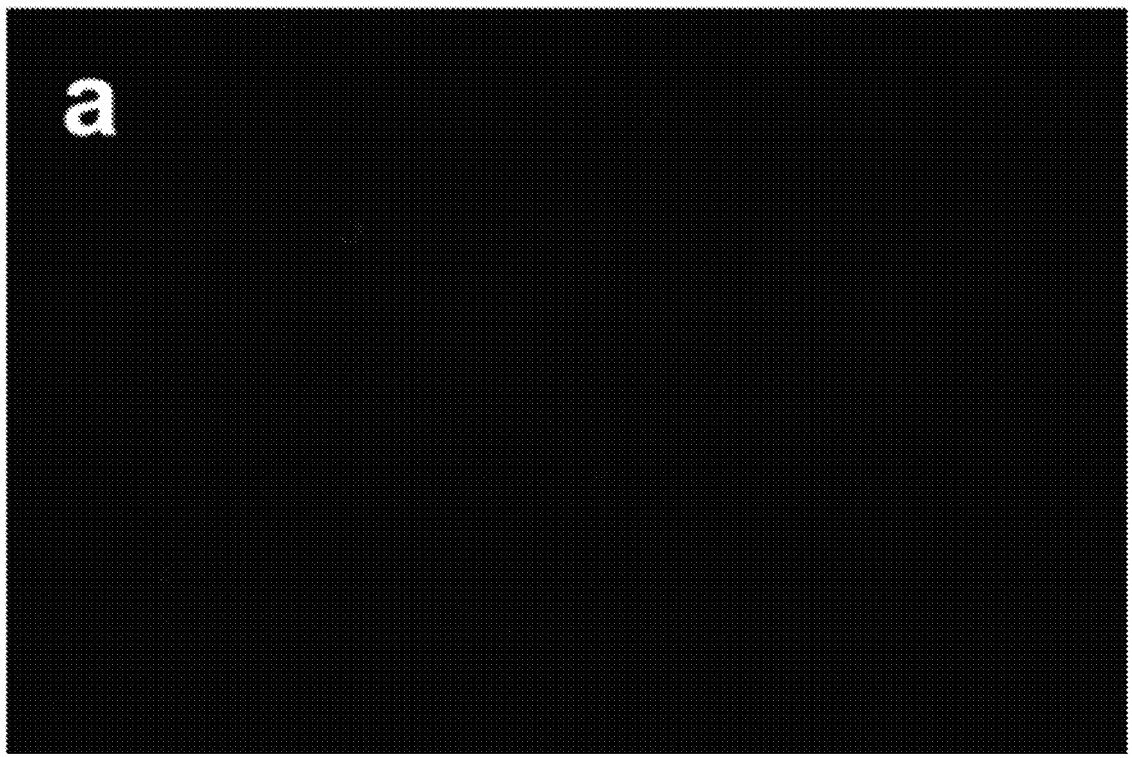
Figure 10B:
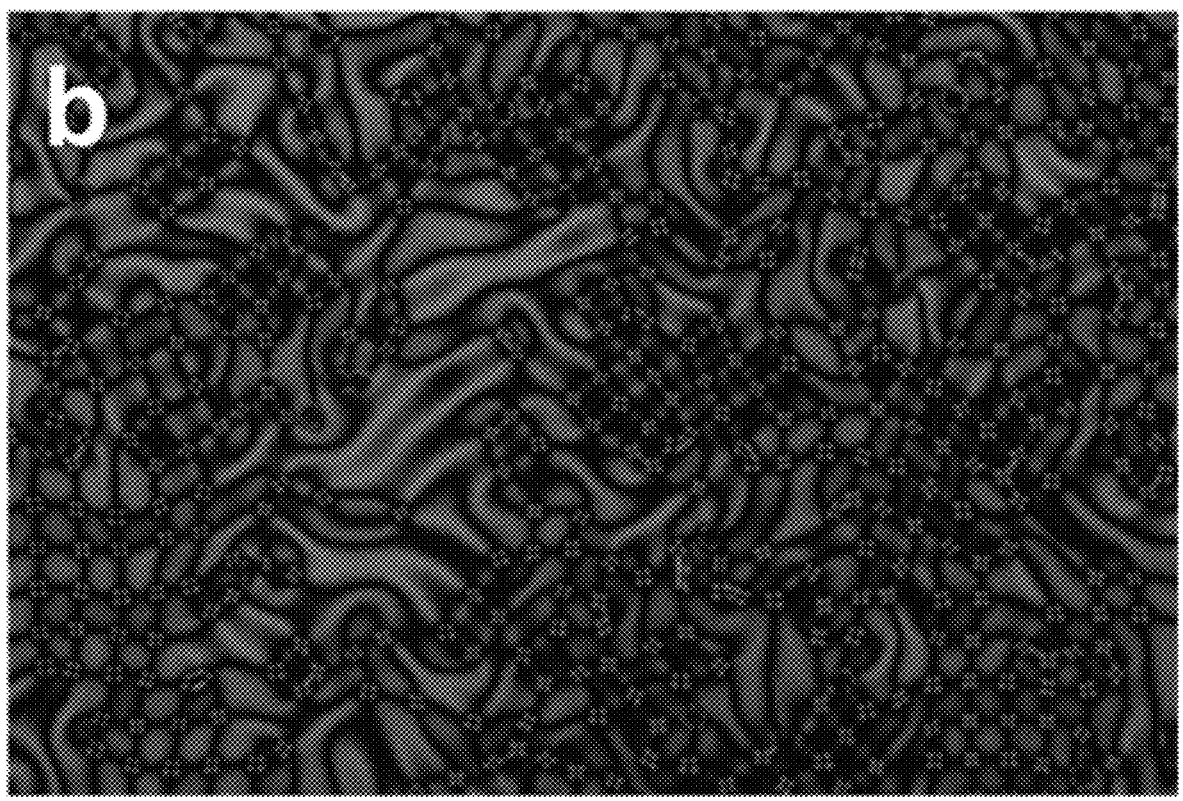
Figure 10C:
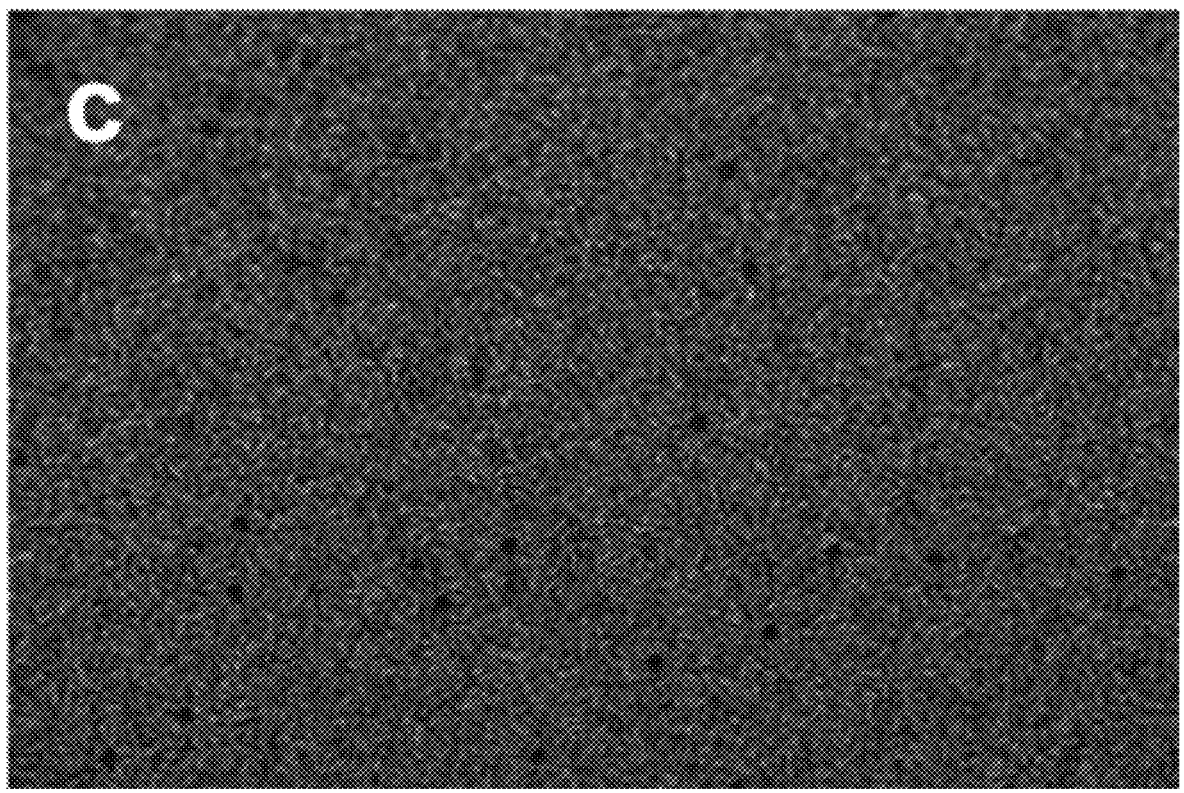
Figure 11A:
Figure 11B:
Figure 11C:
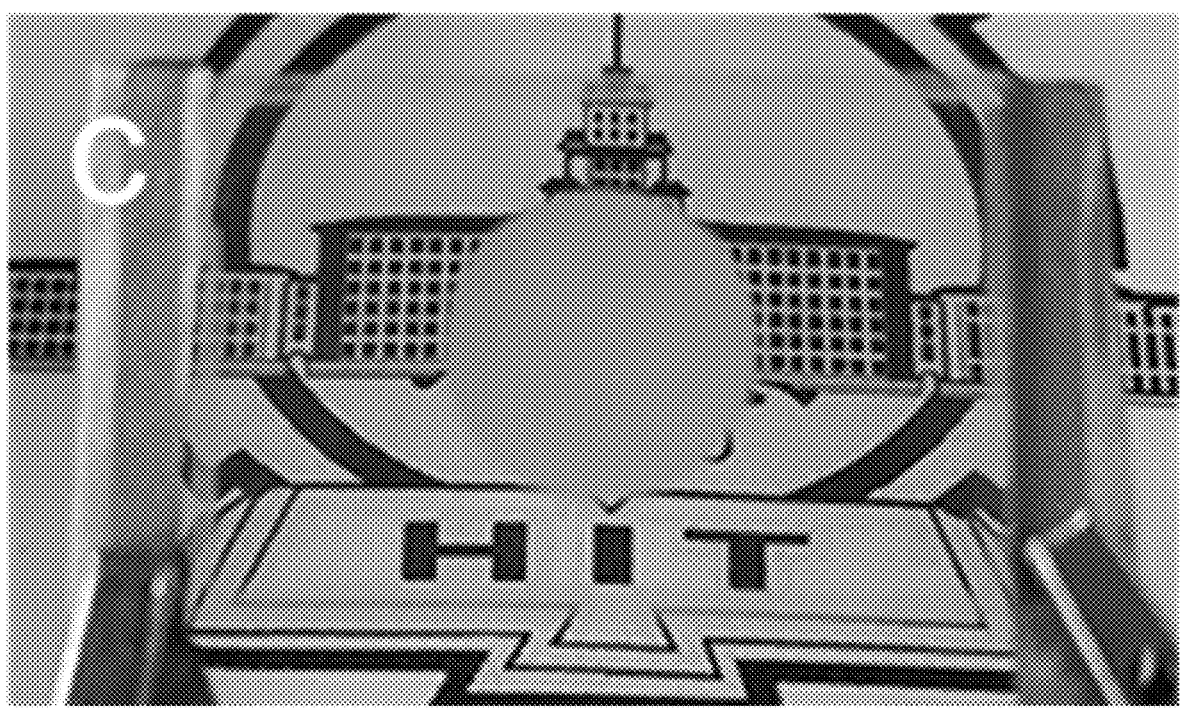

FIGS. 10A, 10B and 11C are POM images of the DSM device doped with cationic and anionic compounds under cross polarization in the comparison experiment 3, wherein FIG. 10A is measured under 0V, FIG. 10B is measured under 20V and 100 Hz, and FIG. 10C is measured under 20V and 50 Hz.

FIGS. 11A, 11B, and 11C are real pictures of the DSM device doped with cationic and anionic compounds in the comparison experiment 3, wherein FIG. 11A is a transparent state under 0V, FIG. 11B is a transparent state under 20V and 100 Hz and FIG. 11C is a scattering state under 20V and 50 Hz.

DETAILED DESCRIPTIONS OF EMBODIMENTS

Implementation 1: the liquid crystal material applied to the multi-response-mode smart window in this implementation is formed by mixing a dichroic dye, an ionic dopant and a liquid crystal.

The ionic dopant is a combination of a cationic surfactant and an anionic surfactant, and a weight ratio of the cationic surfactant to the anionic surfactant is 1:(0.1 to 10).

The object of the present implementation is to provide a mixing formula of the dichroic dye, the ionic dopant and the liquid crystal in the liquid crystal material with negative dielectric anisotropy, where the mixing formula includes a cationic state and an anionic state at the same time to provide different multi-mode drive solutions.

The present implementation provides a method of achieving multi-mode switching under low voltage drive by adjusting a drive electric field frequency. This implementation innovatively proposes a method of doping cationic and anionic surfactants at the same time to design an optimal drive frequency of the ionic dopant. Furthermore, by using the guest-host effect, the dichroic dye having different visible light absorptions along the directions of major and minor axes is dissolved in the aligned liquid crystal body and aligned in the same direction as the liquid crystal molecules based on the principle of "guest changes with host". When the molecule alignment of the liquid crystals as body changes under the electric field, the molecule alignment of the dichroic dye also changes in direction, that is, the absorption of the dichroic dye for incident light also changes. Therefore, this implementation provides a smart window which, on the basis of mixing the dichroic dye, achieves low threshold voltage switching under low frequency electric field by adjusting a ratio of the doped cationic and anionic surfactants.

Based on the design requirements, the dielectric property of the liquid crystal mixture is changed by adjusting the ratio of the cations and anions in the following formula, so as to achieve the adjustment of the optimal drive frequency:

$$\varepsilon' = \frac{nq^2 D^{3/2}}{\pi^{3/2} \varepsilon_0 d k_B T} f^{-3/2} + \varepsilon'_b \quad (1)$$

$$\varepsilon'' = \frac{nq^2 D}{\pi \varepsilon_0 k_B T} f^{-1} \quad (2)$$

wherein $\varepsilon'$ is a real part of the dielectric constant, $\varepsilon''$ is an imaginary part of the dielectric constant, f is a frequency of the drive electric field (Hz), D is a diffusion coefficient (m²/s), q is a cationic charge, n is an ionic density (m⁻³), d is a gap of liquid crystal cells (m), T is an absolute temperature (k), $\varepsilon_0$ is a vacuum dielectric constant (F/m), and $k_B$ is a Boltzmann constant (J/k).

It can be seen that the real part and the imaginary part of the dielectric constant are both a function changing with the frequency of the drive electric field. When the real part and the imaginary part of the dielectric constant are equal, the optimal drive frequency is obtained. By adjusting the doping ratio of the cations and anions, the entire ionic density can be changed without changing the number of the cationic charges, so as to adjust the optimal drive frequency.

In the present implementation, the optimal drive frequency is determined by dielectric spectrum test, namely, by determining the change of the real part and the imaginary part of the dielectric parameter of the mixture along with the frequency, an intersection point is determined as the optimal drive frequency. Furthermore, the liquid crystal phase states under different drive modes are tested by using a polarized microscope and the drive policies of the "light absorption" and "hazing" modes are further determined, so as to finally achieve the multi-mode switching of "transparency-light absorption-hazing".

With the electrohydrodynamic liquid crystal dimming device prepared using the liquid crystal material in this implementation, switching can be performed freely among transparent state, light-absorbing state and scattering state under the electric field. The drive voltage of the liquid crystal dimming device is an alternating current voltage ranging from 5V to 50V, the drive frequency is 1 Hz to 5 kHz, and the thickness of the liquid crystal cell is greater than 5 µm.

Figure 1:
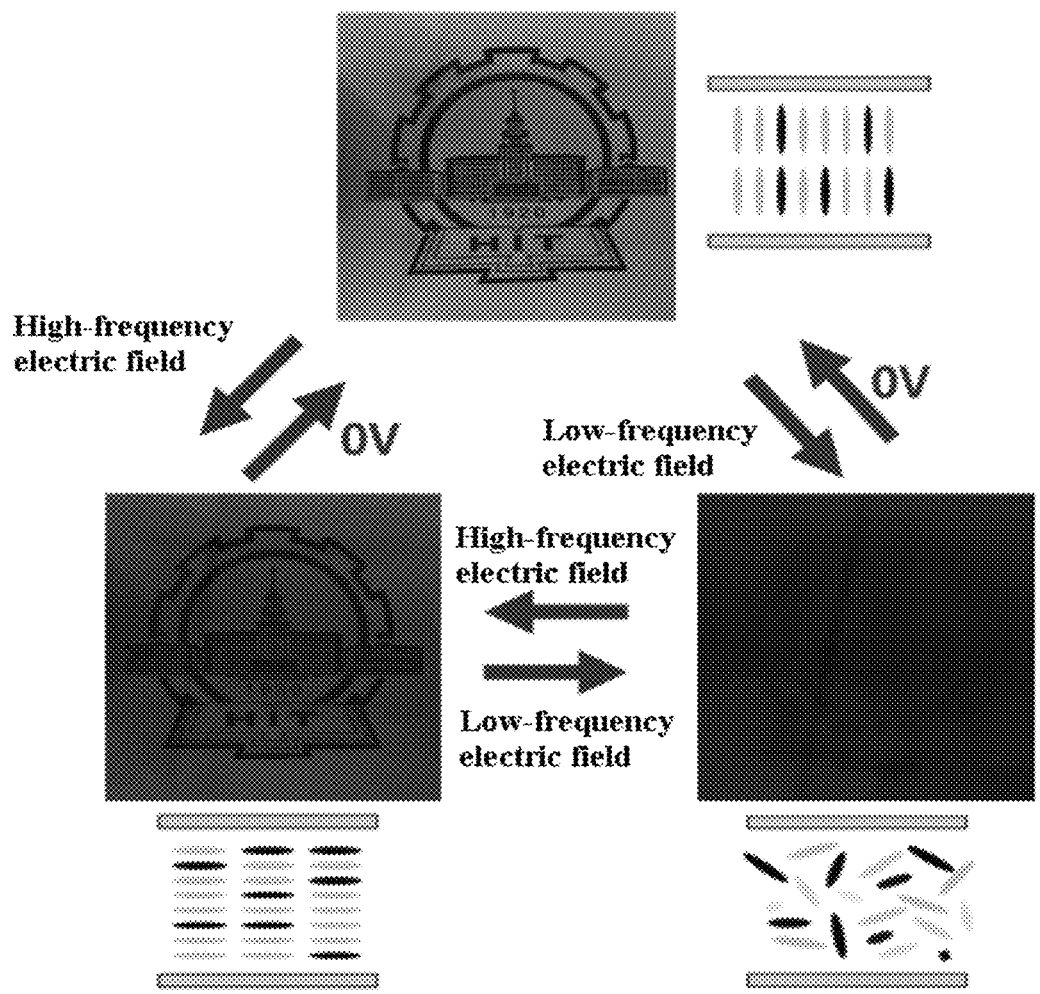
FIG. 1 is a schematic diagram illustrating a structure and working principle of a liquid crystal dimming device according to the present disclosure.

FIG. 1 is a schematic diagram illustrating a structure and a working principle of the liquid crystal dimming device in the present disclosure. In combination with FIG. 1, the structure and the working principle of the electrohydrodynamic-based liquid crystal dimming device are described below: the liquid crystal dimming device includes two transparent baseplates and a liquid crystal mixture. The liquid crystal dimming device includes a transparent glass baseplate (referred to as baseplate hereunder), an ITO conductive layer and an alignment-induced layer sequentially disposed from outside to inside. The alignment layers of the two light-transmitting baseplates are opposed to form an adjusting region between the two light-transmitting baseplates and the adjusting region is filled with a liquid crystal mixture. ITO electrodes of two ITO conductive layers are respectively connected to two poles of an externally-applied alternating current power supply. When the two electrodes are energized, an electric field is formed between the light-transmitting baseplates, where the size of the electric field relates to the voltage connected to the ITO electrodes. Before a voltage is applied, the liquid crystal dimming device is in a transparent state. The dopants of the cationic and anionic compounds are diffused in the liquid crystal molecules, the liquid crystal molecules are aligned perpendicular to the baseplate under the induction of the surface alignment layer and the dichroic dye is also perpendicular to the baseplate due to the "guest-host" effect and hence, the dimming device is in the transparent state. When a voltage is applied, the liquid crystal molecules are aligned parallel to the baseplate along with the electric field, and the dichroic dye is also parallel to the baseplate, and hence the dimming device is changed to the light-absorbing state. The voltage is further increased, and the compounds of the cations and anions doped in the system oscillate back and forth between two electrodes, disrupting the alignment of the liquid crystal molecules in the liquid crystal cell. Therefore, the molecular alignment with specific orientation is changed to disorderly alignment, scattering the incident light of visible light band.

In this specific implementation, the electrohydrodynamics-based liquid crystal dimming device is an optical device capable of switching to the light scattering state from the transparent state under the applied voltage. The electrohydrodynamics-based liquid crystal dimming device can be used to manufacture a smart home and/or display device. Specifically, the electrohydrodynamics-based liquid crystal dimming device can be applied to strong-radiation-preventing optical control switches, displays, electrically-controlled dimming windows, projectors, privacy protection screens or optical storage devices. For example, it can be used for the products capable of blocking visible light in a scattering state for the purpose of privacy.

The specific implementations have the following beneficial effects.

(1) Low drive voltage: in the prior arts, the drive voltage of the scattering mode is generally above 50V. In the present implementation, multi-mode control is achieved by switching the drive electric field frequency, such that the entire dimming device can run under a low voltage (only require 5V to 50V), reducing energy consumption.

Designing of the switching frequency: by adjusting the ratio of the cations and anions of the dopant, the dynamic dielectric constant of the mixture is changed to achieve the designing of the switching frequency.

Long service life: in the present implementation, the ions always oscillate back and forth in the liquid crystal layers of the dimming device and will not accumulate on the electrodes. Therefore, the service life of the DSM-based device can be increased.

Implementation 2: This implementation differs from the implementation 1 in that: the cationic surfactant is formed by mixing one or more of cetyltrimethylammonium bromide, benzyldimethylhexadecylammonium chloride and tetrabutylammonium bromide; the anionic surfactant is formed by mixing one or more of sodium dodecyl sulfate, sodium stearate and decyltrimethylammonium chloride. This implementation is identical in other aspects to the implementation 1.

The cetyltrimethylammonium bromide (CTAB) in this implementation has the following structural formula:

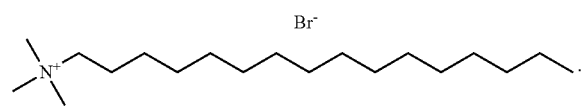 [SMILES: [Br-] ; CCCCCCCCCCCCCCCC[N+](C)(C)C]

The benzyldimethylhexadecylammonium chloride in this implementation has the following structural formula:

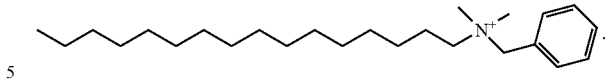

The tetrabutylammonium bromide in this implementation has the following structural formula:

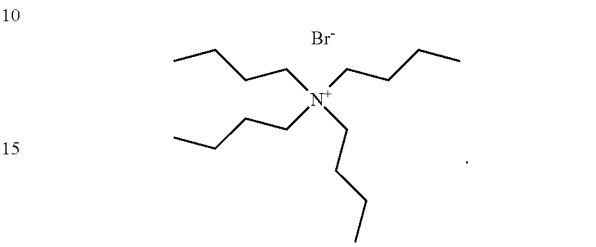

The sodium dodecyl sulfate (SDS) in this implementation has the following structural formula:

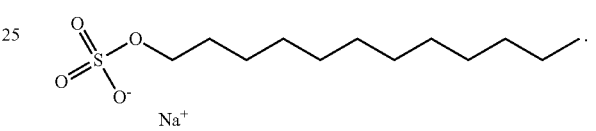

The sodium stearate in this implementation has the following structural formula:

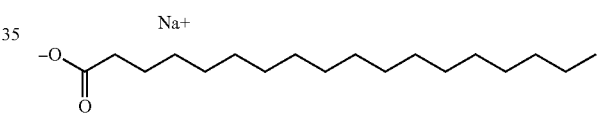

The decyltrimethylammonium chloride in this implementation has the following structural formula:

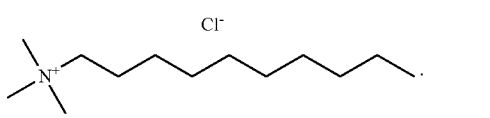

Implementation 3: this implementation differs from one of the implementations 1 and 2 in that: the dichroic dye is a non-ionic azo dye. This implementation is identical in other aspects to the implementation 1 or 2.

Implementation 4: this implementation differs from one of the implementations 1 to 3 in that: the non-ionic azo dye is Sudan black B. This implementation is identical in other aspects to the implementations 1 to 3.

Implementation 5: this implementation differs from one of the implementations 1 to 4 in that: the liquid crystal is a negative dielectric anisotropic rod-shaped liquid crystal. This implementation is identical in other aspects to the implementations 1 to 4.

Implementation 6: this implementation differs from one of the implementations 1 to 5 in that: the negative dielectric anisotropic rod-shaped liquid crystal is E7. This implementation is identical in other aspects to the implementations 1 to 5.

Implementation 7: this implementation differs from one of the implementations 1 to 6 in that: a weight percent of the dichroic dye in the liquid crystal material applied to the multi-response-mode smart window is 0.1% to 2%. This implementation is identical in other aspects to the implementations 1 to 6.

Implementation 8: this implementation differs from one of the implementations 1 to 7 in that: a weight percent of the ionic dopant in the liquid crystal material applied to the multi-response-mode smart window is 0.001% to 5%. This implementation is identical in other aspects to the implementations 1 to 7.

Implementation 9: this implementation differs from one of the implementations 1 to 8 in that: the liquid crystal material applied to the multi-response-mode smart window is formed by mixing the dichroic dye, the ionic dopant and the liquid crystal at the temperature of 70° C. to 120° C. This implementation is identical in other aspects to the implementations 1 to 8.

Implementation 10: this implementation provides an application of the liquid crystal material applied to the multi-response-mode smart window. This liquid crystal material is applied to preparing an electrohydrodynamic liquid crystal dimming device which is capable of switching among transparent state, light-absorbing state and scattering state under a drive voltage of 5V to 50V and a drive frequency of 1 Hz to 5 kHz; and a thickness of a liquid crystal cell of the electrohydrodynamic liquid crystal dimming device is greater than 5 μm.

The following embodiments are used to prove the beneficial effects of the present disclosure.

Embodiment 1

The liquid crystal material applied to the multi-response-mode smart window is formed by mixing a liquid crystal mixture containing the dichroic dye and the ionic dopant at the temperature of 100° C.;
the ionic dopant is a combination of a cationic surfactant and an anionic surfactant, and a weight ratio of the cationic surfactant to the anionic surfactant is 1:2;
a weight percent of the dichroic dye in the liquid crystal material applied to the multi-response-mode smart window is 1%;
a weight percent of the ionic dopant in the liquid crystal material applied to the multi-response-mode smart window is 0.03%;
the cationic surfactant is cetyltrimethylammonium bromide;
the anionic surfactant is sodium dodecyl sulfate.

For the dichroic dye and the liquid crystal in this embodiment, a liquid crystal mixture containing the dichroic dye is directly selected, which was purchased from Yantai Xianhua GXD-DYE8002, Δε=−12.5, TN-I=95° C.

Figure 2:
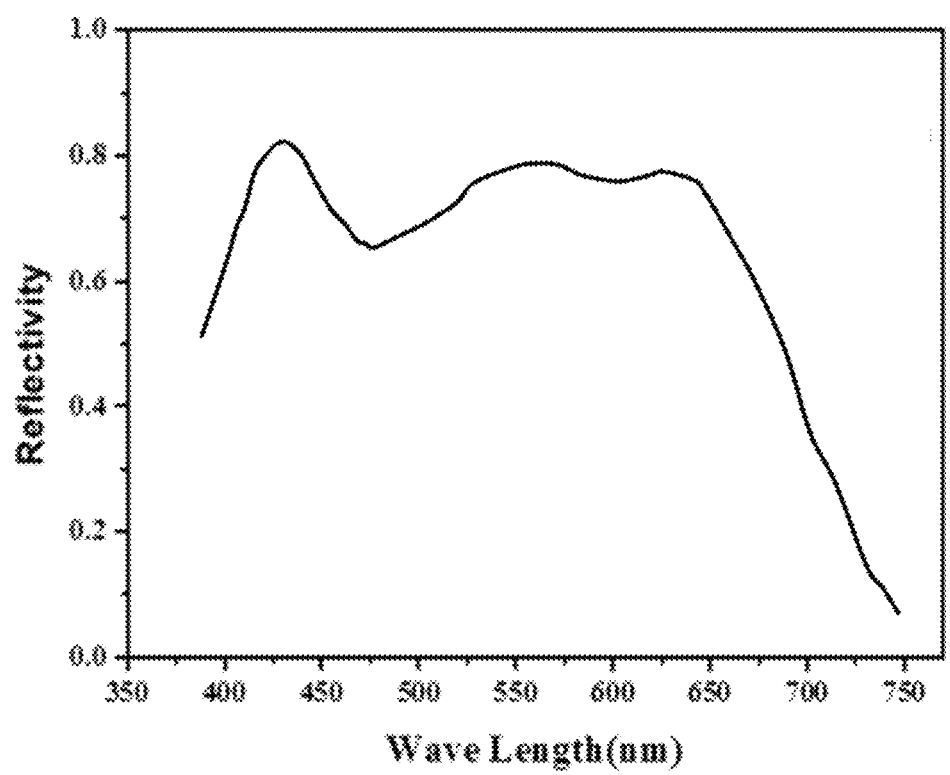
FIG. 2 is absorption spectra of a liquid crystal mixture containing dichroic dye according to an embodiment 1 of the present disclosure.

FIG. 2 is absorption spectra of a liquid crystal mixture containing the dichroic dye according to the embodiment 1 of the present disclosure. It can be known from the drawing that the absorption spectra cover the entire visible light band, and the dimming device in the light-absorbing state is entirely black.

Comparison experiment 1: this comparison experiment differs from the embodiment 1 in that: no anionic surfactant is doped. This experiment is identical in other aspects to the embodiment 1.

Comparison experiment 2: this comparison experiment differs from the embodiment 1 in that: no cationic surfactant is doped. This experiment is identical in other aspects to the embodiment 1.

Comparison experiment 3: this comparison experiment differs from the embodiment 1 in that: no dichroic dye is doped. This experiment is identical in other aspects to the embodiment 1.

The liquid crystal dimming device is prepared: the liquid crystal dimming device includes a transparent glass baseplate, an ITO conductive layer (tin oxide electrode) and an alignment-induced layer (PI induced layer) sequentially disposed from outside to inside. The alignment layers of the two transparent glass baseplates are opposed to form an adjusting region between the two transparent glass baseplates and the adjusting region is filled with a liquid crystal mixture. The liquid crystal material applied to the multi-response-mode smart window in the embodiment 1 and the liquid crystal materials prepared in the comparison experiments 1 to 3 are respectively filled by use of capillary suction into an isotropic liquid crystal cell coated with tin oxide electrode and having a thickness of 10 μm and respectively formed into the DSM device doped with cationic and anionic compounds and dye in the embodiment 1, the DSM device doped with cationic compound and dye in the comparison experiment 1, the DSM device doped with anionic compound and dye in the comparison experiment 2, and the DSM device doped with cationic and anionic compounds in the comparison experiment 3. When the devices are cooled down to room temperature, test will be performed on them.

FIGS. 3A, 3B, 3C, and 3D are dielectric spectra, wherein FIG. 3A is a DSM device doped with cationic compound and dye in a comparison experiment 1, FIG. 3B is a DSM device doped with anionic compound and dye in a comparison experiment 2, FIG. 3C is a DSM device doped with cationic and anionic compounds in a comparison experiment 3, and FIG. 3D is a DSM devices doped with cationic and anionic compounds and dye in an embodiment 1, where 1 is ε' and 2 is ε". It can be known from the drawing that there is a dielectric point of intersection in the DSM device doped with cations in the comparison experiment 1 but the optimal drive frequency is near 1 kHz and hence, under the condition of industrial power supply (50 Hz), it is difficult to achieve low-voltage drive; it can be seen from the comparison experiment 2 that there is no intersection point in the DSM device doped with anions and dynamic scattering cannot be generated; by comparison of the comparison experiment 3 and the embodiment 1, it can be seen that the non-ionic dichroic dye basically does not affect the dielectric performance of the device. Therefore, it can be further applied to other non-ionic dye mixing formulas. Further, it can be known from the drawing that the optimal drive solution of the DSM device doped with cationic and anionic compounds and dye in the embodiment 1 is as follows: transparent state (0V), light-absorbing state (20 v, 500 Hz), and scattering state (20 v, 50 Hz).

Photoelectric test is performed on the DSM device doped with cationic and anionic compounds and dye in the embodiment 1, with the results shown in Table 1.

TABLE 1

|  | Drive policy | Transmission rate | Haze |
| --- | --- | --- | --- |
| Transparent state | 0 V | 73% | 0.02% |
| Light absorbing state | 20 V, 500 Hz | 49% | 0.03% |

TABLE 1-continued

| | Drive policy | Transmission rate | Haze |
|---|---|---|---|
| Scattering state | 20 V, 50 Hz | 8% | 87.82% |
| After switching for 10000 times | 20 V, 50 Hz | 8% | 88.37% |

FIGS. 4A, 4B, and 4C are POM images of the DSM device doped with cationic and anionic compounds and dye under cross polarization in the embodiment 1, wherein FIG. 4A is measured under 0V, FIG. 4B is measured under 20V and 500 Hz, and FIG. 4C is measured under 20V and 50 Hz. It can be known from the drawing that in a case of 0V, the liquid crystal molecules are aligned perpendicular to the baseplate and in a transparent state; when the voltage 20V and the electric field 500 Hz are applied, the liquid crystal molecules are aligned parallel to the baseplate and in a light-absorbing state; when the voltage 20V and the electric field 50 Hz are applied, the liquid crystal molecules are disorderly distributed and in a scattering state.

FIGS. 5A, 5B, 5C, and 5D are real pictures of the DSM device doped with cationic and anionic compounds and dye in the embodiment 1, wherein FIG. 5A is a transparent state under 0V, FIG. 5B is a light-absorbing state under 20V and 500 Hz, FIG. 5C is a scattering state under 20V and 50 Hz, and FIG. 5D is a scattering state after switching continuously for 10000 times under 20V and 50 Hz. The drawings FIG. 5A to FIG. 5C are consistent with the POM image, and FIG. 5D shows that the service life of the DSM device in the embodiment 1 is greater than 10000 times.

Photoelectric test is performed on the DSM device doped with cationic compound and dye in the comparison experiment 1, with the results shown in Table 2.

TABLE 2

| | Drive policy | Transmission rate | Haze |
|---|---|---|---|
| Transparent state | 0 V | 73% | 0.03% |
| Light absorbing state | 20 V, 100 Hz | 51% | 0.05% |
| Scattering state | 60 V, 50 Hz | 7% | 88.07% |
| After switching for 10000 times | 60 V, 50 Hz | 19% | 65.33% |

FIGS. 6A, 6B and 6C is a POM image of the DSM device doped with cationic compound and dye under cross polarization in the comparison experiment 1, wherein FIG. 6A is measured under 0V, FIG. 6B is measured under 20V and 100 Hz, and FIG. 6C is measured under 60V and 50 Hz. It can be known from the drawing that in a case of 0V, the liquid crystal molecules are aligned perpendicular to the baseplate and in a transparent state; when the voltage 20V and the electric field 100 Hz are applied, the liquid crystal molecules are aligned parallel to the baseplate and in a light-absorbing state; when the voltage 60V and the electric field 50 Hz are applied, the liquid crystal molecules are disorderly distributed and in a scattering state.

FIGS. 7A, 7B, 7C and 7D are real pictures of the DSM device doped with cationic compound and dye in the comparison experiment 1, wherein FIG. 7A is a transparent state under 0V, FIG. 7B is a light-absorbing state under 20V and 100 Hz, FIG. 7C is a scattering state under 60V and 50 Hz, FIG. 7D is a scattering state after switching continuously for 10000 times under 60V and 50 Hz. The drawings a to c are consistent with the POM image, and the drawing d shows that the service life of the DSM device in the comparison experiment 1 is less than 10000 times.

Photoelectric test is performed on the DSM device doped with anionic compound and dye in the comparison experiment 2, with the results shown in Table 3.

TABLE 3

| | Drive policy | Transmission rate | Haze |
|---|---|---|---|
| Transparent state | 0 V | 73% | 0.02% |
| Light absorbing state | 20 V, 100 Hz | 48% | 0.01% |
| Scattering state | — | — | — |

FIGS. 8A, 8B and 8C are POM images of the DSM device doped with anionic compound and dye under cross polarization in the comparison experiment 2, wherein FIG. 8A is measured under 0V, FIG. 8B is measured under 20V and 100 Hz, and FIG. 8C is measured under 60V and 50 Hz. It can be known from the drawing that in a case of 0V, the liquid crystal molecules are aligned perpendicular to the baseplate and in a transparent state; when the voltage 20V and the electric field 100 Hz are applied, the liquid crystal molecules are aligned parallel to the baseplate and in a light-absorbing state; when the voltage 60V and the electric field 50 Hz are applied, the liquid crystal molecules are not disorderly distributed nor in a scattering state.

FIGS. 9A and 9B are real pictures of the DSM device doped with anionic compound and dye in the comparison experiment 2, wherein FIG. 9A is a transparent state under 0V, and FIG. 9B is a light-absorbing state under 20V and 100 Hz. It is consistent with the POM image.

Photoelectric test is performed on the DSM device doped with cationic and anionic compound in the comparison experiment 3, with the results shown in Table 4.

TABLE 4

| | Drive policy | Transmission rate | Haze |
|---|---|---|---|
| Transparent state | 0 V | 73% | 0.02% |
| Light absorbing state | — | — | — |
| Scattering state | 20 V, 50 Hz | 10% | 90.06% |

FIGS. 10A, 10B and 11C are POM images of the DSM device doped with cationic and anionic compounds under cross polarization in the comparison experiment 3, wherein FIG. 10A is measured under 0V, FIG. 10B is measured under 20V and 100 Hz, and FIG. 10C is measured under 20V and 50 Hz. It can be known from the drawing that in a case of 0V, the liquid crystal molecules are aligned perpendicular to the baseplate and in a transparent state; when the voltage 20V and the electric field 100 Hz are applied, the liquid crystal molecules are aligned parallel to the baseplate and are in a transparent state due to no addition of the dichroic dye; when the voltage 20V and the electric field 50 Hz are applied, the liquid crystal molecules are disorderly distributed and in a scattering state.

FIGS. 11A, 11B, and 11C are real pictures of the DSM device doped with cationic and anionic compounds in the comparison experiment 3, wherein FIG. 11A is a transparent state under 0V, FIG. 11B is a transparent state under 20V and 100 Hz and FIG. 11C is a scattering state under 20V and 50 Hz. It can be known from the drawing that it is consistent with the POM image.

What is claimed is:
1. A liquid crystal material applied to a multi-response-mode smart window, wherein, the liquid crystal material applied to the multi-response-mode smart window is formed by mixing a dichroic dye, an ionic dopant, and a liquid crystal;

the ionic dopant is a combination of a cationic surfactant and an anionic surfactant, wherein a weight ratio of the cationic surfactant to the anionic surfactant is 1:(0.1 to 10).

2. The liquid crystal material of claim 1, wherein the cationic surfactant is formed by mixing one or more of cetyltrimethylammonium bromide, benzyldimethylhexadecylammonium chloride and tetrabutylammonium bromide; the anionic surfactant is formed by mixing one or more of sodium dodecyl sulfate, sodium stearate and decyltrimethylammonium chloride.

3. The liquid crystal material of claim 1, wherein the dichroic dye is a non-ionic azo dye.

4. The liquid crystal material of claim 3, wherein the non-ionic azo dye is Sudan black B.

5. The liquid crystal material of claim 1, wherein the liquid crystal is a negative dielectric anisotropic rod-shaped liquid crystal.

6. The liquid crystal material of claim 5, wherein the negative dielectric anisotropic rod-shaped liquid crystal is E7.

7. The liquid crystal material of claim 1, wherein a weight percentage of the dichroic dye in the liquid crystal material applied to the multi-response-mode smart window is 0.1% to 2%.

8. The liquid crystal material of claim 1, wherein a weight percentage of the ionic dopant in the liquid crystal material applied to the multi-response-mode smart window is 0.001% to 5%.

9. The liquid crystal material of claim 1, wherein the liquid crystal material applied to the multi-response-mode smart window is formed by mixing the dichroic dye, the ionic dopant and the liquid crystal at the temperature of 70° C. to 120° C.

10. An application of the liquid crystal material applied to the multi-response-mode smart window as mentioned in claim 1, wherein the liquid crystal material is applied to preparing an electrohydrodynamic liquid crystal dimming device which is capable of switching among transparent state, light-absorbing state and scattering state under a drive voltage of 5V to 50V and a drive frequency of 1 Hz to 5 kHz; and a thickness of a liquid crystal cell of the electrohydrodynamic liquid crystal dimming device is greater than 5 μm.

* * * * *